(12) United States Patent
Shimizu et al.

(10) Patent No.: US 6,618,200 B2
(45) Date of Patent: Sep. 9, 2003

(54) SYSTEM AND METHOD FOR PROVIDING A SUBSTRATE HAVING MICRO-LENSES

(75) Inventors: Nobuo Shimizu, Suwa (JP); Shinichi Yotsuya, Suwa (JP); Hideto Yamashita, Suwa (JP); Masami Murata, Shiojiri (JP); Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/828,831

(22) Filed: Apr. 10, 2001

(65) Prior Publication Data
US 2002/0027715 A1 Mar. 7, 2002

(30) Foreign Application Priority Data

Apr. 25, 2000 (JP) .......................... 2000-124352
Mar. 30, 2001 (JP) .......................... 2001-101308

(51) Int. Cl.$^7$ .................................. G02B 27/14
(52) U.S. Cl. .................................. 359/619; 359/626
(58) Field of Search .................. 359/619, 620, 359/621, 622, 626

(56) References Cited

U.S. PATENT DOCUMENTS 4,074,933 A * 2/1978 Yevick ........................ 353/120
6,129,866 A * 10/2000 Hamanaka et al. ............ 216/24
6,363,603 B1 * 4/2002 Nemoto et al. ................ 29/458

FOREIGN PATENT DOCUMENTS

| JP | A-5-346577 | 12/1993 |
| JP | 7-17490 | 1/1995 |
| JP | A-7-181487 | 7/1995 |
| JP | A-7-199188 | 8/1995 |
| JP | A-8-15687 | 1/1996 |
| JP | A-9-269483 | 10/1997 |
| JP | A-11-24060 | 1/1999 |

* cited by examiner

Primary Examiner—Ricky Mack
(74) Attorney, Agent, or Firm—Oliff & Berridge, PLC

(57) ABSTRACT

The present invention provides a micro-lens substrate wherein a higher contrast ratio can be obtained when used in a liquid crystal panel and the like. A micro-lens substrate includes a first substrate with concaves for microlenses having a plurality of first concaves and first alignment marks formed on a first glass substrate, a second substrate with concaves for microlenses having a plurality of second concaves and second alignment marks formed on a second glass substrate, a resin layer, microlenses comprised of double convex lenses formed of a resin filled in between the first and second concaves, and spacers.

31 Claims, 13 Drawing Sheets

SYSTEM AND METHOD FOR PROVIDING A SUBSTRATE HAVING MICRO-LENSES

BACKGROUND OF THE INVENTION

1. Field of Invention

The present invention relates to a manufacturing method of a micro-lens substrate, a micro-lens substrate, an electro-optic device, an opposing substrate for a liquid crystal panel, a liquid crystal panel and a projection display device.

2. Description of Related Art

Currently, projection display device, that project images onto a screen are known. A liquid crystal panel is mainly used for creating the image. It is further known that some of the liquid crystal panels of this type have many tiny micro-lenses provided at the positions according to respective pixels of the liquid crystal panel for efficient utilization of light. These micro-lenses are usually formed on a micro-lens substrate that are included in the liquid crystal panel.

FIG. 12 shows a longitudinal section of a conventional structure of a micro-lens substrate used in a liquid crystal panel. As shown, micro-lens substrate 900 has a glass substrate 902 with many hemispheric concaves 903 and a cover glass 908 bonded to a surface, where the concaves 903 of the glass board 902 are formed via a resin layer 909. Also, in the resin layer 909, micro-lenses 904 are formed by a resin filled in the concaves 903.

Recently the progress and development of liquid crystal panels has advanced, and the quality of the images is remarkably good. As a result, it is often required that a liquid crystal panel with an extremely high contrast ratio and transmittance be developed to achieve even higher image quality. However, there is a limit to raise the contrast ratio and the transmittance in micro-lens substrate 900 having the structure shown in FIG. 12.

SUMMARY OF THE INVENTION

A purpose of the present invention is to provide a manufacturing method of a micro-lens substrate having a high contrast ratio and transmittance when used, for example, in a liquid crystal panel or the like.

A method for manufacturing a micro-lens substrate according to the present invention has the feature of bonding a first substrate having a plurality of curved lens surfaces and a second substrate having a plurality of curved lens surfaces to each other, thereby forming a plurality of microlenses consisting of double convex lenses.

The microlens substrate manufacturing method of the present invention has the further feature of bonding a first substrate having a plurality of first concave portions that have curved lens surfaces to a second substrate having a plurality of second concave portions that have curved lens surfaces via a resin so that the first concave portions and the second concave portions face each other, thereby forming a plurality of microlenses that consist of double convex lenses between the first and second substrates.

A more desirable micro-lens can be formed as follows. The curvature radius of the curved surface of lens of the first substrate and the curvature radius of the curved surface of lens of the second substrate are different. The curvature radius of the curved surface of the lens of the first substrate is greater than the curvature radius of the curved surface of the lens of the second substrate. The maximum thickness of the micro-lens is in the range of 10~120 micrometers. The focal length of the micro-lens is in the range of 20~1000 micrometers. A resin containing a spacer is placed on the outside of the region where the curved lens surfaces of the first substrate and/or the second substrate are placed, and the first substrate and the second substrate are conjugated. The spacer is particulate. Each alignment marker is provided on the first substrate and the second substrate, and the alignment of the first substrate and the second substrate is accomplished using the alignment marker and the first substrate and the second substrate are bonded to each other. The curved lens surfaces of the first substrate and the second substrate are made using a mask layer, and the alignment marks of the first substrate and the second substrate are formed using a mask layer.

The micro-lens substrate of the present invention is a micro-lens substrate with plural micro-lenses being arranged on the substrate, wherein the micro-lens comprises a double convex lens. The first substrate with plural concaves arranged on its surface and the second substrate are bonded to each other via a resin layer, and the micro-lens is formed by a double convex lens between the first substrate and the second substrate.

The first substrate with plural concaves being arranged on its surface and the second substrate with plural concaves being arranged on its surface are bonded to each other via a resin layer so that the concave of the first substrate and the concave of the second substrate face one another, and the micro-lens is made of double convex lens between the first substrate and the second substrate.

Preferably, the thickness of the resin layer in the region where the micro-lens is not placed is nearly the same as the Koba thickness of the micro-lens. The first substrate is thicker than the second substrate. The spacer is arranged to define the thickness of the resin layer on the outside of the region where the micro-lens is placed. The spacer is particulate. The curvature radius of curve surface on the light-incident side of the micro-lens and the curvature radius of curve surface on the light-emergent side of the micro-lens are different from each other. In case of operation where light falls on the side of the first substrate, the curvature radius of curve surface on the light-incident side of the micro-lens is greater than the curvature radius of curve surface on the light-emergent side of the micro-lens. The maximum thickness of the micro-lens is in the range of 10~120 micrometers. The focal length of the micro-lens is in the range of 20~1000 micrometers. Alignment marks as an indicator for aligning are provided outside of the region where the micro-lenses are formed.

The opposing substrate for a liquid crystal panel according to the present invention can have a micro-lens substrate, a black matrix arranged on the micro-lens substrate and an electro-conductive layer covering the black matrix.

A liquid crystal panel according to the present invention can include a liquid crystal drive substrate with a pixel electrode, and an opposing substrate for a liquid crystal panel bonded to the liquid crystal drive substrate and a liquid crystal filled in the gap between the liquid crystal drive substrate and the opposing substrate for a liquid crystal panel. Preferably, the liquid crystal drive substrate is a TFT substrate having pixel electrode arranged like a matrix and a thin film transistor connected to the pixel electrode.

The projection display device has light valves having a liquid crystal panel, and it modulates light using at least one of the light valves and projects images.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

It should be noted that according to the present invention a substrate with concave portions for microlenses, a micro-lens substrate and an opposing substrate for a liquid crystal panel include both individual substrates and wafers.

The present invention, after extensive study has been made to overcome the limitations described above. In particular, with reference to the micro-lens of structure shown in FIG. 12, the angle of the incident light on the micro-lens is small around the rim of the micro-lens, and the aberration (mainly the spherical aberration) is large. As a result of this, in the micro-lens structure shown in FIG. 12, incident light on the vicinity of the rim of the micro-lens is not utilized effectively as emergent light. Therefore, with the micro-lens structure shown in FIG. 12, it will reach a limit to raise the brightness of the emergent light of the micro-lens. On the other hand, this limit can be overcome by the present invention.

The details of the present invention are explained hereafter, with reference to the preferred embodiment shown in the attached drawing. The micro-lens substrate shown in the following embodiment can be used as a part of a liquid crystal panel.

Figure 1:
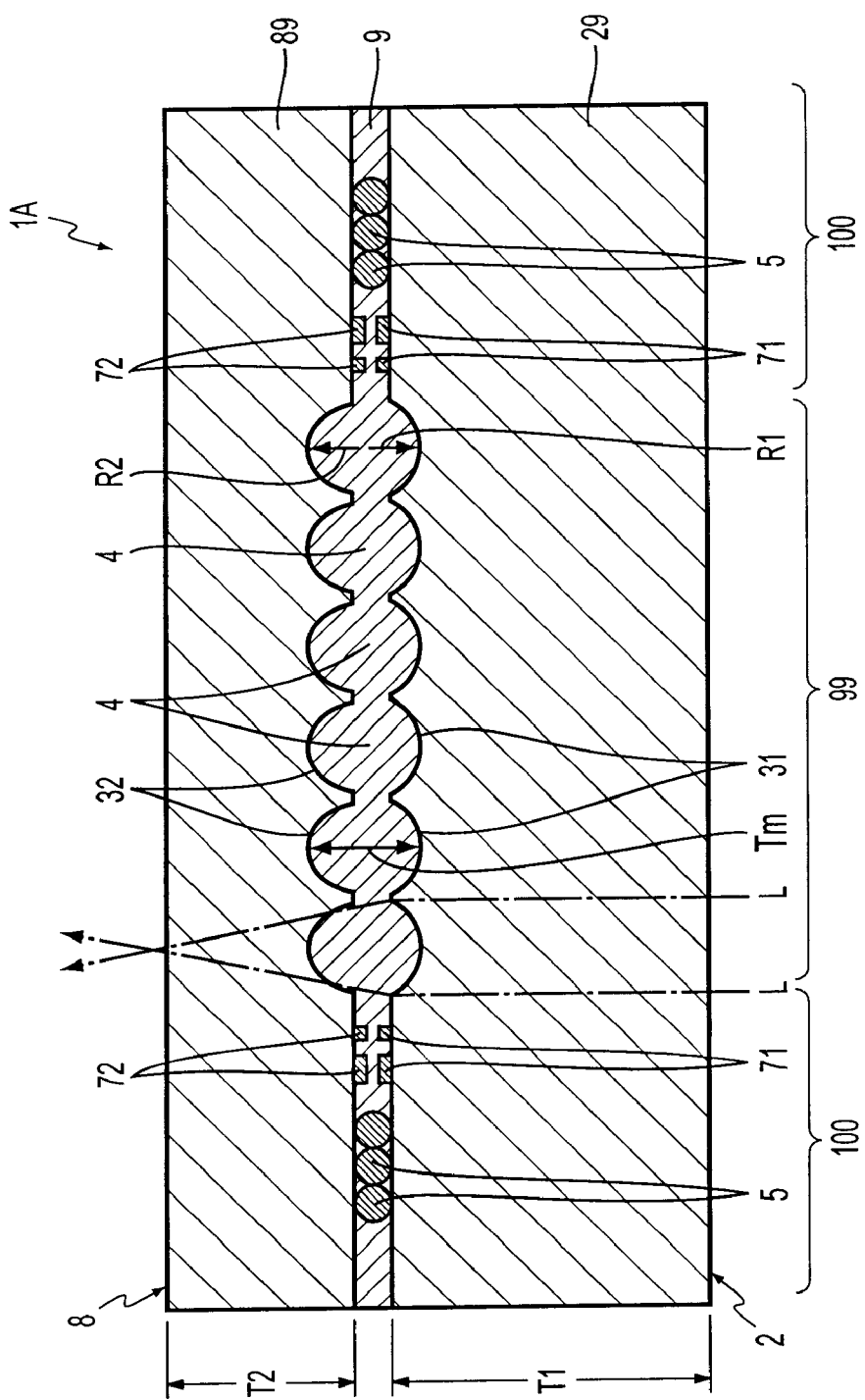
FIG. 1 is a drawing of typical longitudinal section showing the first embodiment of the micro-lens substrate according to the present invention.

FIG. 1 shows an exemplary longitudinal section of the first embodiment of the micro-lens substrate of the present invention. As shown, the micro-lens substrate 1A of the present invention comprises a first micro-lens substrate with concaves (the first substrate) 2, a second micro-lens substrate with concaves (the second substrate) 8, resin layer 9, the micro-lens 4 and a spacer 5. The first concave micro-lens substrates 2 comprises a plural (many) first concaves (concave for micro-lenses) 31 having concave curved surfaces (curved lens surfaces) on the first glass substrate (the first transparent substrate) 29 and the first alignment mark 71.

The second concave micro-lens substrates 8 comprises a plural (many) second concaves (concaves for micro-lenses) 32 having concave curved surfaces (curved lens surfaces) on the second glass substrate (the second transparent substrate) 32 and the second alignment mark.

Figure 13:
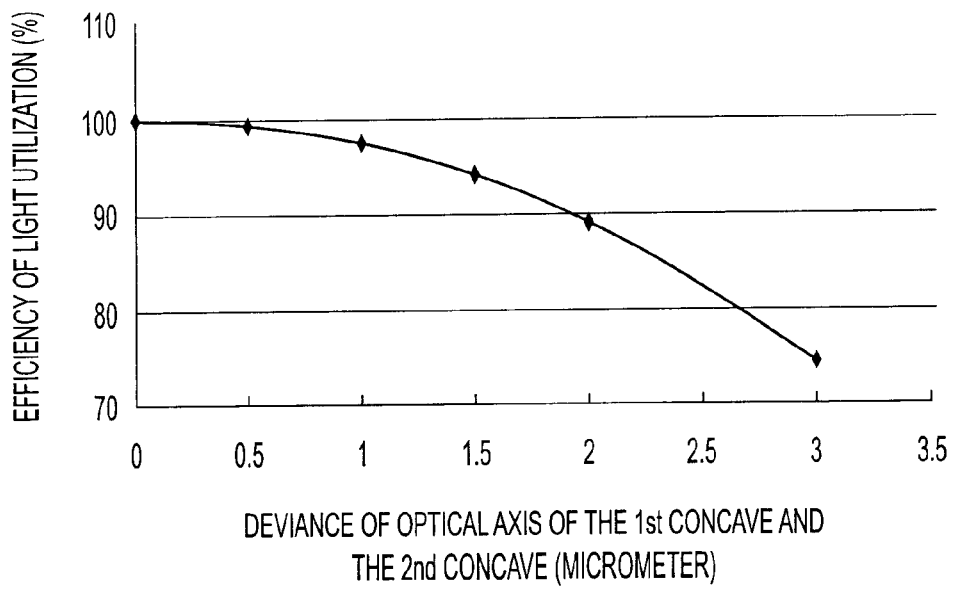
FIG. 13 is a drawing to show the correlation of the efficiency of light utilization to deviation of the optical axis of the first concave and the second concave.

Micro-lens substrate 1A is formed by the first concave micro-lens substrate 2 and the second concave micro-lens substrate 8 being conjugated through resin layer (adhesive coated layer) 9 as the optical axis of lens of the first concave 31 and the optical axis of lens of the second concave 32 are established within 2 micrometers in the opposed direction. FIG. 13 shows to what extent a deviation in alignment between the first concave portion 13 and the second concave portion 32 with respect to the X axis reduces light utilization efficiency. In the figure, the utilization efficiency of light is set as 100% at 0 micrometer in deviation. Judging from the figure, it is found that when deviation of the first concave and the second concave exceeds 2 micrometers, utilization efficiency is lowered to less than 90%.

A contrast is affected by this deviation. Contrast depends on the angle of incident light on the liquid crystal surface. The best contrast is obtained when the angle of the incident light is perpendicular to the liquid crystal surface. However, the contrast becomes low with the liquid crystal device if the angle of the incoming light to the liquid crystal surface becomes deviated out of vertical.

Figure 14:
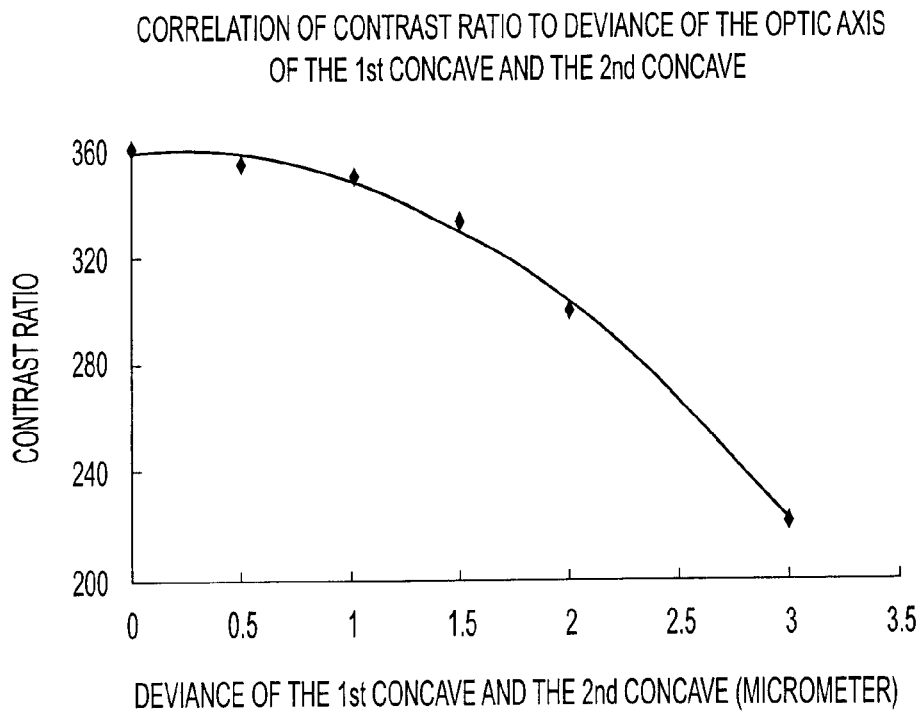
FIG. 14 is a drawing to show correlation of contrast ratio to the deviation of the optical axis of the first concave and the second concave.

FIG. 14 shows the relationship of the deviation of the first concave and the second concave with the contrast based on actual data. FIG. 14 shows that the greater deviation causes a lower contrast as the light enters the liquid crystal with deviation to the perpendicular. For instance, if a light valve with not greater than 280 in contrast is used in a projector, black appears light gray in color. Therefore a clear image cannot be obtained.

As described above, it is necessary that the first concave 31 and the second concave 32 be established with the optical axis of the lens of both concaves facing each other within 2 micrometers in an opposed way from the point of view of preventing lowering utilization efficiency of light and lower contrast shown in FIGS. 13 and 14.

Further, a microlens substrate 1A has, between a first substrate with concave portions for microlenses and a second substrate with concave portions, microlenses 4 that consist of double convex lenses made of a resin filled in between a first concave portions 31 and a second concave portions 32.

The micro-lens substrate 1A has two regions composed of an active lens region 99 and an inactive lens region 100. An active lens region 99 means that it is a region where a micro-lens 4 made of a resin filled in the first concave 31 and the second concave 32 is actually used as the micro-lens. On the other hand, inactive lens region 100 means that it is a region excluding the active lens region 99.

The micro-lens substrate 1A is used, for instance, in a manner that light L enters at the side of the first concave micro-lens substrate 2 and emerges at the side of the second concave micro-lens substrate 8. For this micro-lens substrate 1A, a thickness of the first micro-lens substrate with concave T1 is thicker than the thickness of the second concave micro-lens substrate T2.

For micro-lens board 1A, a curvature radius R1 of the curved lens surface on the light-incident side of a micro-lens 4 is greater than a curvature radius R2 of the curved lens surface on the emergent side. That is, the micro-lens substrate 1A has a curvature radius of the first concave 31 that is greater than the curvature radius of the second concave. Moreover, the micro-lens board 1A has a distance between the end faces where the first concave micro-lens substrate 2 and the second concave micro-lens substrate 8 face each other (the thickness of the portion of resin layer 9 where micro-lens 4 is not formed) that substantially matches or corresponds to the Koba thickness of a micro-lens 4.

As in the micro-lens substrate of the present invention, if a micro-lens is formed by a convex lens, the aberration of a micro-lens 4 (especially spherical aberration) becomes smaller. This is why incident light L, of course, falls on not only the vicinity the center area of a micro-lens 4, but also on the rim area of a micro-lens 4 is preferably condensed. Namely, the utilization efficiency of the light of a micro-lens 4 is high. Therefore, the micro-lens substrate 1A can emit light L with high brightness.

For instance, in order to increase lens power, it is possible to bond two substrates having convex microlenses formed thereon to each other so that respective convex portions face each other, whereby a lens system comprising two hemispheric planar convex lenses is provided in a substrate.

However, such a lens system cannot sufficiently improve the aberration of a micro-lens. On the contrary, as in the microlens substrate 1A of the present invention, if the micro-lens 4 is constructed with a convex lens, the aberration of a micro-lens can be lowered in a preferable manner.

Especially, with the micro-lens substrate 1A shown in FIG. 1, the aberration of the micro-lens 4 (especially the spherical aberration) is extremely small, if the curvature radius R1 of the curved surface of the lens on the incoming side of a micro-lens 4 is greater than curvature radius R2 of the curved surface of the lens on the emitting side. Therefore, with the micro-lens 4 shown in FIG. 1, it is preferable to prevent the emitting light from being emitted in a direction which greatly deviates from the optical axis of the micro-lens 4. That is why the utilization efficiency of light with micro-lens 4 is extremely high. Then micro-lens substrate 1 can emit light with extremely high brightness.

In addition, it will be possible to prevent emergent light going out in a direction that largely deviates from the optical axis of the microlenses 4 if the aberration of the microlenses 4 is reduced. Because of this, the use of the microlenses 4 in a liquid crystal panel will make it possible to prevent the emergent light passing through the microlenses 4 from entering pixels adjacent to each other. In other words, cross talk between pixels can be prevented. Therefore, the brightness of black in color is found to be extremely low when an image is formed using the liquid crystal panel that has the micro-lens 1A of the present invention.

As micro-lens substrate 1A of the present invention has such advantages, the black color appears darker and the white color appears lighter when an image is formed using a liquid crystal panel in which a micro-lens substrate 1A of the present invention is provided. Therefore, the liquid crystal panel having the micro-lens substrate 1A of the present invention can provide a higher contrast ratio and form a more accurate image.

As in the micro-lens substrate 1A shown in FIG. 1, when a thickness T1 of the first micro-lens substrate with the concave 2 is thicker than a thickness T2 of the second micro-lens substrate with the concave 8, it is easier to set the focal point of emergent light L of the micro-lens 4 to an area around the surface of the second micro-lens substrate with the concave 8. Because of this, as described hereafter, the lowering of the brightness of the emitting light L can easily be prevented easily, even if a black matrix is made on a micro-lens substrate 1A.

Moreover, as in the microlens substrate 1A shown in FIG. 1, if microlenses 4 are formed of a resin inserted between a first substrate 2 with concaves for microlenses and a second substrate 8 with concaves for microlenses, that is, if a first substrate 2 with concaves for microlenses and a second substrate 8 with concaves for microlenses are bonded to each other via a resin layer 9 so that first concaves 31 and second concaves 32 face each other, then it is not necessary to make the substrate thinner on the light-incident side, namely the first substrate 2 with concaves for microlenses. Therefore, the strength of the micro-lens substrate 1A is increased. As the micro-lens substrate 1A in FIG. 1, when the first concave 31 and the second concave 32 are filled with the resin, the contact areas of the first concave micro-lens substrate 2 and the second concave micro-lens substrate 8 with resin layer 9 become larger. For this reason, the bonding strength between the concave micro-lens substrate 2 and the second micro-lens substrate with 8 increases. (Anchor effect)

Also, as in the micro-lens substrate 1A shown in FIG. 1, it is easy to design a micro-lens substrate 1A to obtain the desirable optical properties, if the distance between the end faces where the first micro-lens substrate with the concave 2 and the second micro-lens substrate with the concave 8 face each other substantially matches or corresponds to the Koba thickness of the micro-lens 4.

In addition to the effect described above, the micro-lens substrate 1A of the construction shown in FIG. 1 has advantage that it can be manufactured at a relatively low cost.

From the point of view of more effectively obtaining the effect described previously, the micro-lens preferably meets the following conditions.

In cases where micro-lens substrate 1A is used in a liquid crystal panel, the focal length of the micro-lens 4 should preferably be in the range of 20~1000 micrometer, and more preferably in the range of 50~200 micrometers. As a result, a liquid crystal panel having micro-lens substrate 1A can form images with a high contrast ratio.

In addition, with micro-lens substrate 1A, it is relatively easy to set the focal length of the micro-lens to the range described above.

The maximum thickness Tm of a micro-lens 4 is preferably in the range of 10~120 micrometers, and more preferably in the range of 15~60 micrometers. Due to this, the micro-lens 4 can condense a light more preferably. In addition, it makes it easier to set the focus point of emergent light L to an area around the surface of the second concave micro-lens substrate.

A micro-lens substrate 1A preferably has a distance between the end surfaces where the second concave micro-lens substrate 2 and the second concave micro-lens substrate 8 face each other, namely, the Koba thickness of a micro-lens 4 that is in the range of 0.1~100 micrometers, more preferably in the range of 1~20 micrometers. Due to this, the micro-lens substrate 1A can obtain the effect described above more effectively.

In cases where the micro-lens substrate 1A is used in a liquid crystal panel, the curvature radius R1 of the curved lens surface the light-incident side of a micro-lens 4, namely, the curvature radius of the first concave 31, is preferably in the range of 5~50 micrometers. The curvature radius R2 of curved lens surface of the light-emergent side of a micro-lens 4, namely, the curvature radius of the second concave 32 is preferably in the range of 3~30 micrometers. Therefore, in a liquid crystal panel, a higher contrast ratio can be obtained. This also makes designing a liquid crystal panel easier.

A micro-lens substrate 1A has a correlation between the curvature R1 of the curved surface of the lens on the light-incident side of a micro-lens 4 and the curvature R2 of curved surface of lens on the light-emergent side of a micro-lens 4 that preferably satisfies the condition where $1<R1/R2<3.3$, and more preferably the condition $1.1<R1/R2<2.2$. Due to this, the micro-lens 4 can reduce the aberration more preferably.

The thickness T1 of the first concave micro-lens substrate is preferably in the range of 0.3~5 mm, more preferably in the range of 0.5~2 mm, even though the range can vary depending on various conditions such as the material of the first concave micro-lens substrate 2 and its refractive index. This makes it easier to achieve a microlens substrate 1A that has both compactness and strength.

The thickness T2 of the second concave micro-lens substrate 8 is preferably in the range of 5~1000 micrometer in cases where the micro-lens substrate 1A is used for a liquid crystal panel, more preferably in the range of 10~150 micrometers. This makes it easier to setting up the focus point of the emergent light of a micro-lens 4 to an area around the surface of a micro-lens.

The thickness of the second concave micro-lens substrate 8 is preferably in the range of $\frac{1}{1000}$~$\frac{1}{2}$ of the thickness T1 of the first concave micro-lens substrate T1, and more preferably $\frac{1}{200}$~$\frac{1}{5}$. This makes it easier to set the focus point of the emergent light to an area around the surface of a micro-lens substrate 1A with high strength being kept.

In cases where such a microlens substrate 1A is used in a liquid crystal panel and the liquid crystal panel has a glass substrate other than a first glass substrate 29 (for example, a glass substrate 171 that will be described later), it is preferable to have a thermal expansion coefficient of the first glass substrate 29 substantially equal to that of the other glass substrate that is provided in the liquid crystal panel (for example, a thermal expansion coefficient ratio between the two substrates may be in the range of $\frac{1}{10}$ to 10). This prevents the liquid crystal panel from warping or flexing or separating because of the difference of the thermal expansion coefficient between the two substrates when the temperature changes.

Judging from this point of view, it is preferable that the first glass substrate 29 and the other glass substrate of a liquid crystal panel should be made of the same kind of material. This prevents the liquid crystal panel from warping or flexing or separating because of the difference of the thermal expansion coefficient between the two substrates when the temperature changes.

In particular, in cases where the micro-lens substrate 1A is used in the TFT liquid crystal panel of high temperature polysilicon, it is preferable that the first glass substrate 29 should be made of silica glass. The TFT liquid crystal panel has a TFT substrate as a liquid crystal drive substrate. Silica glass is preferably used for the TFT substrate, as silica glass is stable in the manufacturing state in terms of the physical properties. For this objective, preparation of the first glass substrate made of silica glass can provide a TFT liquid crystal panel that least likely causes warp or flexure and has excellent stability.

Such a micro-lens substrate 1A has a thermal expansion coefficient of the second glass substrate 89 that is substantially equal to the thermal expansion coefficient of the first glass substrate 29 (for instance, the ratio of both the thermal expansion coefficients should be around $\frac{1}{10}$~10). This prevents warping or, flexing or separating due to the difference of the thermal expansion coefficient between the first glass substrate 29 and the second glass substrate 89. Especially, in the micro-lens substrate 1A, the first glass substrate 29 and the second glass substrate 89 should be made of the same kind of material. This makes it more effective to obtain such an effect.

The resin layer 9 covering the first concave and the second concave can be made of a resin (adhesive material) with a higher refractive index than the material that the first glass substrate 29 and the second glass substrate 89 are made of. For instance, resin layer 9 can be preferably made of ultraviolet cured resins such as acryl resins, epoxy resins, acryl epoxy resins.

In such as a micro-lens substrate 1A, spacer 5 to define thickness of resin layer 9 is placed on the outside of region where micro-lens is arranged, namely, in the inactive lens region 100. Such a spacer 5 is particulate.

Placing spacer 5 on a micro-lens substrate 1A makes it easier to set the thickness of the resin layer 9 to a fixed thickness. Further, it can suppress inconsistencies in the thickness of the resin layer 9. Especially, as shown in FIG. 1, if the spacer 5 is placed in the inactive lens region, the spacer 5 is less likely to influence negative effects in the optical properties of the micro-lens 4.

On the first concave micro-lens substrate, on the outside of region where micro-lens 4 (the first concave 31) is placed, namely, in the inactive lens region 100, the first alignment mark 70 is placed as an indicator for aligning. Furthermore, on the second concave micro-lens substrate 8, on the outside region where the micro-lens 4 (the second concave 32) is placed, namely, in the inactive lens region 100, the second alignment mark 72 is placed as an indicator for aligning.

Placing the first alignment mark and the second alignment mark on micro-lens substrate 1A makes aligning the first concave 31 with the second concave 32 easier.

In micro-lens substrate 1A shown in FIG. 1, the thickness of T1 of the first concave micro-lens substrate 2 is thicker than the thickness of T2 of the second concave micro-lens substrate 8, but both thicknesses can be the same. In the micro-lens substrate 1A shown in FIG. 1, the curvature radius R1 of curved surface of lens on the incoming side of the micro-lens 4 is greater than the curvature radius R2 of the curved surface of the lens on the emitting side of the micro-lens 4, but both of the curvature radii can be the same. Even the curvature radius R2 can be greater than curvature radius R1. The Koba thickness of a micro-lens 4 does not have to be the same or corresponding to the distance between the end surfaces of which the first concave micro-lens substrate 2 and the second concave micro-lens substrate 8 face each other. In micro-lens substrate 1A, the light L can come in from the side of the second concave micro-lens substrate 8 and go out from the side of the first concave micro-lens substrate 2.

In micro-lens substrate 1A of the present embodiment, a spacer 5 is arranged, but it is not always necessary to have a spacer. Nor is always necessary to put alignment marks on a micro-lens substrate.

Different kinds of resin can be used to fill the first concave 31 and the second concave 32.

Hereafter, the second embodiment of a micro-lens board of the present invention is explained. This explanation on the second embodiment of a micro-lens substrate below will be focused on the different features from the first embodiment, and description of the common features will be omitted.

Figure 8:
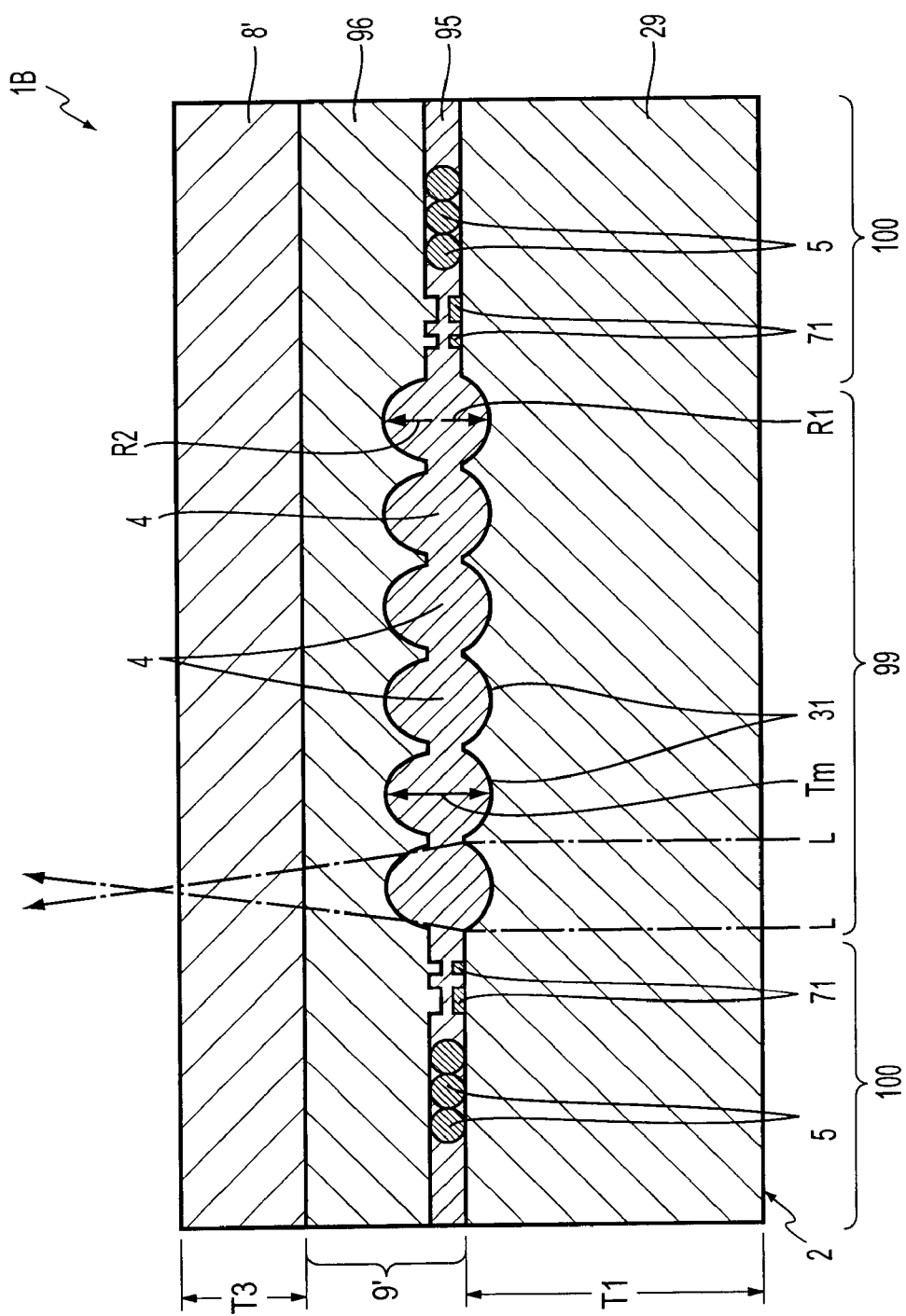
FIG. 8 is a schematic drawing of longitudinal section showing the embodiment of the second embodiment related to the present invention.

FIG. 8 is a typical drawing of longitudinal section showing the second embodiment of a micro-lens substrate of the present invention.

As shown in the drawing, the micro-lens substrate 1B comprises the first concave micro-lens substrate (the first substrate) 2 and glass layer (the second substrate) 8' bonded to each other via resin layer 9' having the first resin layer and the second resin layer. Plural (many) micro-lenses 4 are formed in the first resin layer 95.

As for the first resin layer 95, the same features described on resin layer 9 of the micro-lens substrate 1A are applicable. Spacer 95 is placed in the inactive lens region 100 of the first resin layer 95.

In the first resin layer 95, the micro-lens 4 is arranged at the portion where the first concave is formed. Among the resins which compose the micro-lens 4, the resin on the side of the first concave micro-lens substrate 2 fills the inside of the first concave 31. Among the resins of which the micro-lens 4 is composed, resins of the first concave micro-lens substrate 2 and the other side forms a protrusion, namely, forming a convex surface (the curved surface of the lens).

The second resin layer 96 is formed on the first resin layer 95 so as to cover the micro-lens 4. The second resin layer 96 is made of a resin with a lower refractive index than the resin of the first resin layer 95, for instance. For example, the second resin layer 96 can be made of ultraviolet cured type of resins such as epoxy resins.

A glass layer (cover glass) 8' is bonded to the second resin layer 96. In micro-lens substrate 1B, thickness T1 of the first concave micro-lens substrate 2 is thicker than the thickness of the glass layer 8'.

For such a micro-lens substrate 1B, a thickness of the first resin layer in the region where micro-lens 4 is not formed is substantially equal to or corresponding to Koba thickness of a micro-lens 4. This makes it easier to design micro-lens substrate 1B to obtain desirable optical properties.

Such a microlens substrate 1B has advantages that since micro-lens 4 can be manufactured by 2P method, the fabrication cost can be reduced.

In such a micro-lens 1B, the thickness of the resin layer is not specifically limited, but preferably is in the range of 5~200 micrometers, more preferably is in the range of 10~70 micrometers.

For resin layer 9', thickness of the second resin layer (in the region where micro-lens 4 is not formed) 96 is preferably around 1.5~20 times thicker than thickness of the first resin layer 95, more preferably around 2~10 times. This makes it easier to set the focal point of emergent light L of a micro-lens 4 to an area around the surface of glass layer 8'.

For a micro-lens substrate 1B, thickness T3 of glass layer 8' is preferably in the range of 2~1000 micrometers in cases where micro-lens substrate 1B is used in a liquid crystal panel, more preferably in the range of 5~150 micrometers. This makes it easier to set the focal point of the emergent light of the micro-lens 4 to an area around the surface of a micro-lens substrate 1B.

Further, the thickness T3 of glass layer 8' is preferably 1/1000~1/4 of magnitude of thickness of the first concave micro-lens board 2, more preferably 1/200~1/10. This makes it easier to set the focal point of the emergent light to an area around the surface of a micro-lens substrate 1B while maintaining high strength.

Regarding the thermal expansion coefficient and material of glass layer 8', the same description is applicable to the second concave micro-lens substrate 8 for the same reasons described previously.

The third embodiment of the micro-lens substrate of the present invention is explained below. The explanation on the third embodiment of a micro-lens substrate below will focus on features different from the first and second embodiments, and description of the common features will be omitted.

Figure 9:
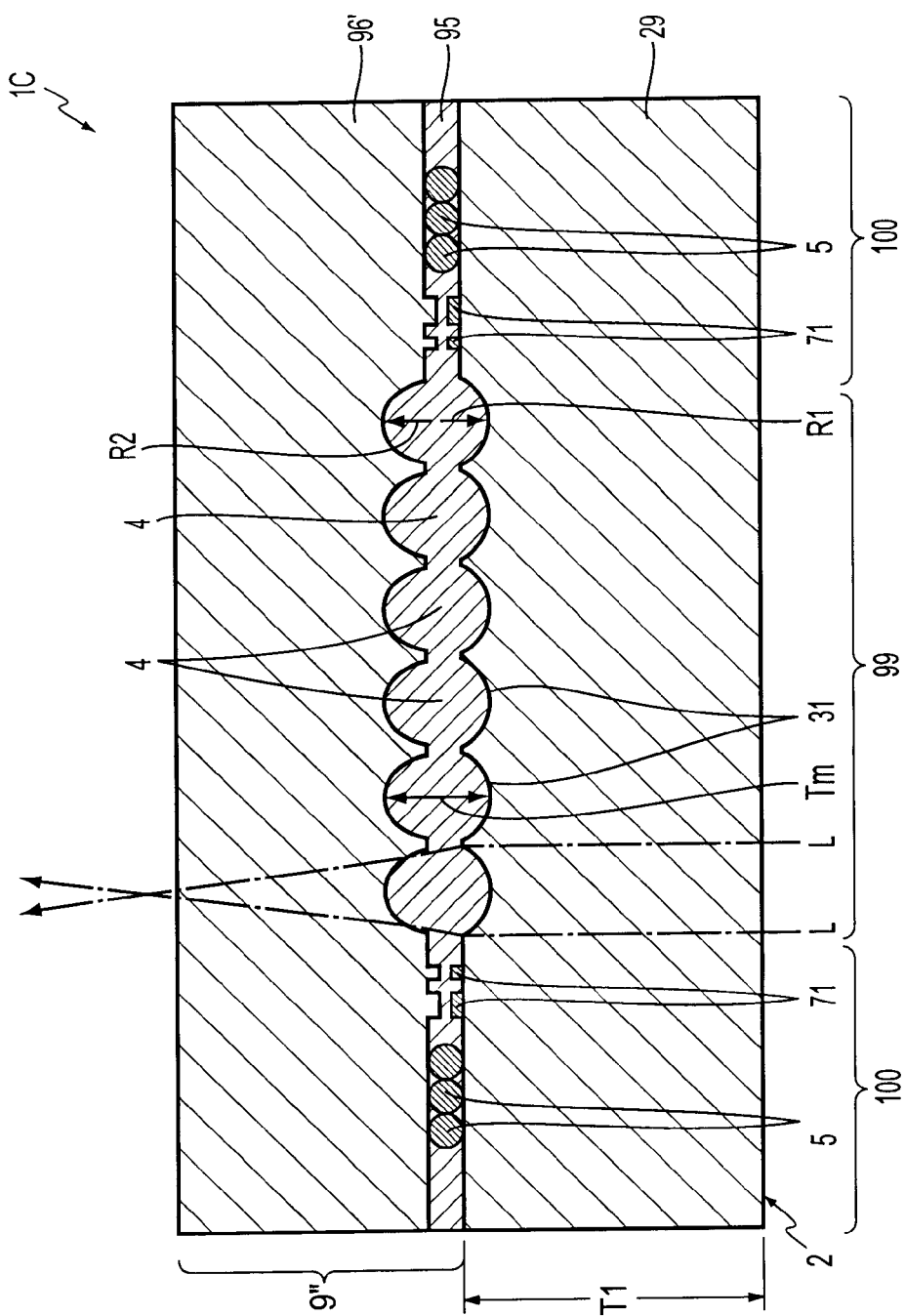
FIG. 9 is a schematic drawing of longitudinal section showing the embodiment of the third embodiment related to the present invention.

FIG. 9 is a typical drawing of the longitudinal section showing the third embodiment of the micro-lens substrate of the present invention.

As shown in the drawing, the micro-lens substrate 1C of the present invention comprises the first concave micro-lens substrates 2 (the first substrate), the first resin layer 95 arranged on the first concave micro-lens substrate 3 and the second resin layer 96' arranged on the first resin layer 95. Plural (many) micro-lens 4 are formed on the first resin layer 95. The resin layer 9" is formed by the first resin layer 95 and the second resin layer 96' on micro-lens substrate 1C.

For the resin layer 9", the thickness of the second resin layer 96' (in the region where the micro-lens 4 is not formed) is preferably around 3~40 times as thick as the thickness of the first resin layer 95, and more preferably around 5~20 times. This makes it easier to set the focal point of the emergent light L of the micro-lens 4 to an area around the surface of the micro-lens substrate 1C.

Such a microlens substrate 1B has advantages that because the micro-lens 4 can be manufactured by the 2P method, the fabrication cost can be reduced.

For micro-lens 1C, the thickness of the resin layer 9" is not specifically limited, but is preferably in the range of 10~400 micrometers, more preferably in the range of 20~150 micrometers.

On the surface of such a resin layer 9", a barrier layer can be provided to protect the resin layer 9". This barrier layer can be made of a ceramic or a thermal resisting resin, for instance.

The micro-lens substrate 1A described previously can be manufactured in the following manner for instance. An explanation of the manufacturing method of a micro-lens substrate 1A is made hereafter, with reference to FIGS. 2–5.

In manufacturing the micro-lens substrate 1A, at first, it is necessary to arrange the first concave micro-lens substrate 2 and the second concave micro-lens substrate 8. For instance, the first concave micro-lens substrate 2 and the second concave micro-lens substrate 8 can be manufactured and prepared in the following manner. The manufacturing method of the first concave micro-lens substrate 2 will be explained as a representative embodiment where the second concave micro-lens substrate 8 can be manufactured in a manner similar to the first concave micro-lens substrate 2.

In the manufacturing method of the first concave micro-lens substrate 2 explained next, the first concave is formed in using of mask layer 6 on the first glass substrate 29, and the first alignment mark is formed using a part of mask layer 6.

At first, as a base material, a unprocessed first glass substrate 29 is prepared for instance. The first glass substrate 29 has preferably a uniform thickness and has no flexure or flaws.

Figure 2A:
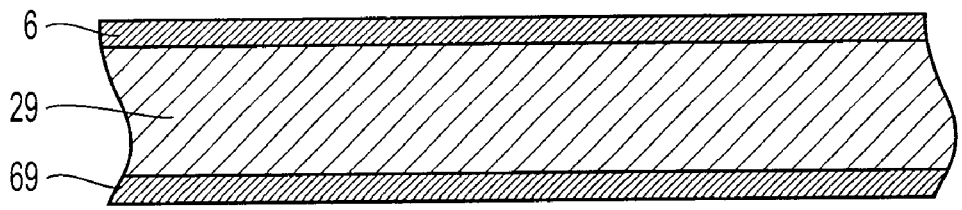
FIG. 2 is a drawing to explain the manufacturing method of the micro-lens substrate related to the present invention.

In process <1A>, at first, a mask layer 6 is formed on the surface of the first glass substrate 29, as shown in FIG. 2(a).

Along with this, a back side protection layer 69 is formed on the back side of the first glass substrate 29 (the reverse surface of the surface where the mask layer 6 is formed). This mask layer 6 should preferably be resistant to the etching operation in the process <4> described later. With such a point of view, metals such as Au/Cr, Au/Ti, Pt/Cr, Pt/Ti, polycrystalline silicon (polysilicon), silicon such as amorphous silicon, silicon nitride are preferably used as a material of mask layer 6.

Improvement of adhesive properties between mask layer 6 and the glass substrate 29 are achieved if a silicon is used for the mask layer 6. An improvement of the visibility of first alignment mark 71 is achieved if metal is used for the mask layer 6.

The thickness of the mask layer 6 is not specifically limited, but is preferably in the range of 0.01~10 micrometers, more preferably in the range of 0.2~1 micrometers. If the mask layer 6 is too thin, there is some chance when the first glass substrate 29 can not be protected. If the mask layer 6 is too thick, there is some chance when mask layer 6 is likely separated due to the internal stress in mask layer 6.

Mask layer 6 can be formed by a vapor deposition method such as chemical vapor deposit method, the sputtering method, vapor deposit method, and the plating method, for example.

The back side protection layer 69 formed on the reverse side of the first glass substrate 29 protects the reverse side of the first glass substrate 29 in the following steps. This reverse side protection layer 69 prevents erosion, and deterioration of the reverse side of the first glass substrate 29 in a preferable manner. This back side protection layer 69 is made of the same material as the mask layer 6, for instance. Therefore, the back side protection layer 69 can be formed at the same time the mask layer 6 is formed in the same way as the mask layer 6 is formed.

Figure 2B:
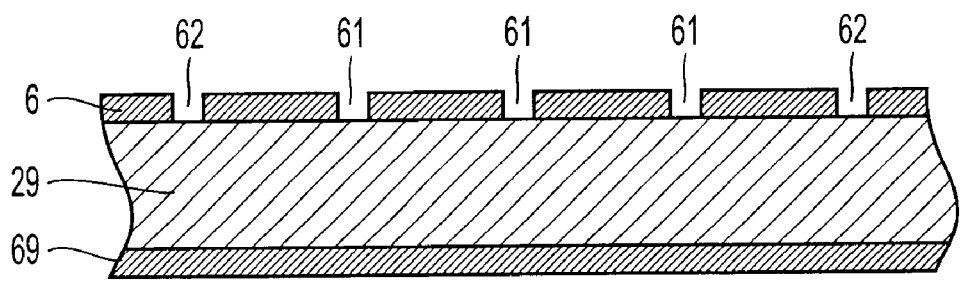

In process <2A>, next, opening 61 and the second opening 62 are made on the mask layer 6 as shown in FIG. 2(b). For example, an opening 61 is placed at the position where the first concave 31 is formed. The shape of the opening 61 (flat shape) preferably corresponds to the shape of the first concave 31 (flat shape) that is formed.

The second opening 62 is placed at the position where the first alignment mark 71 is formed. For instance, the shape of second opening 62 corresponds to a portion of the shape of the first alignment mark.

The opening 61 and second opening 62 can be made by means of photolithography, for embodiment. Specifically, at first, the resist layer (not shown) with a pattern corresponding to the opening 61 and the second opening 62 is formed. Then, part of the mask layer 6 is removed by using the resist layer as a mask. Next, the resist layer is removed. Then, opening 61 and second opening 62 are made. Partial removal of the mask layer 6 can be accomplished by dry etching with CF gas, chlorine gases, and by immersion in a removal agent (wet etching) such as hydrofluoric acid+nitric acid aqueous solution, alkali aqueous solution.

Figure 2C:
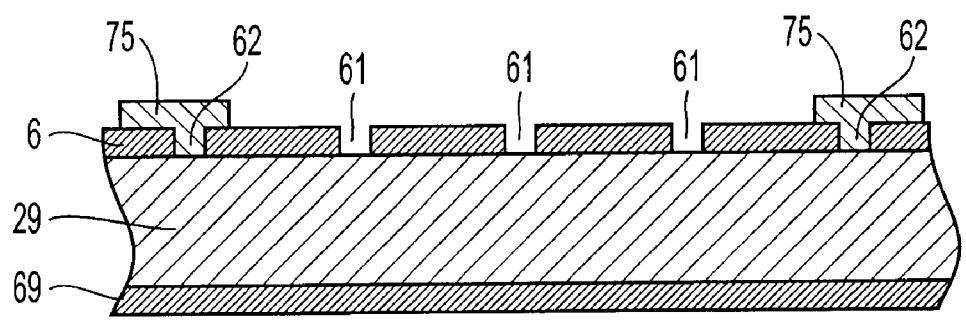

In process <3> next, a protection layer 75 is formed on the mask layer 6 as shown in FIG. 2(c). This protection layer 75 is placed in a position where the first alignment mark is formed. The shape of the protection layer 75 corresponds to the shape of the first alignment mark.

This protection layer 75 should preferably be resistant to the etching in the process <4> described later and eliminating mask layer 6 in the process <5>, also described later. This allows forming the shape of the first alignment mark 71 exactly in a fixed shape. From such a point of view, the protection layer 75 should be preferably made of: a metal such as Au/Cr, Au/Ti, Pt/Cr, Pt/Ti, or SiC; a silicon such as polycrystalline silicon or amorphous silicon; a silicon compound such as silicon nitride; or resist such as negative type of resist.

This protection layer 75 is preferably made of different material from the material of mask layer 6. Therefore in cases where mask layer 6 is made of silicon, the protection layer 75 should be preferably made of metal, for instance. In another way, in case the mask layer 6 is made of metal, the protection layer 75 should be made of silicon, for instance. This prevents the protection layer 75 from being eroded when the mask layer 6 is removed in the process <5> described hereafter.

The protection layer 75 can be formed with a vapor phase membrane development method such as vapor deposit (mask vapor deposit), sputtering (mask sputtering). It is optional to combine a photolithography method with the methods described above. For instance, a film of the material for protection layer 75 is deposited on the entire first glass board 29 so as to cover the mask layer 6. And on the film, the resist corresponding to the position and shape of the alignment mark 71 is patterned, and then etching is conducted to form the first alignment mark 71.

Figure 3D:
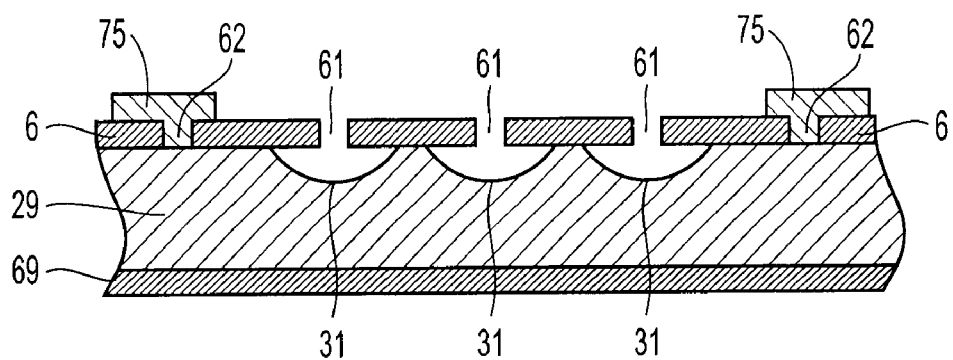
FIG. 3 is a drawing to explain the manufacturing method of the micro-lens board related to the present invention.

In process <4A>, next, as shown in FIG. 3(d), the first concave 31 is formed on the first glass substrate 29.

As a method of forming the first concave 31, an etching method such as a dry etching method and wet etching method can be used. The first glass substrate 29 is eroded in an isotropic manner through an opening 61 with an etching method to form the first concave 31 in the shape of a lens.

Especially, by means of the wet etching method, the first concave 31 can be formed to be closer to the ideal lens shape. For the etching liquid used in the etching operation, hydrofluoric acid based etching liquid is preferable. In this operation, the addition of alcohol such as glycerin (especially, poly alcohol) to the etching liquid makes the surface of the first concave 31 extremely smooth.

Figure 3E:
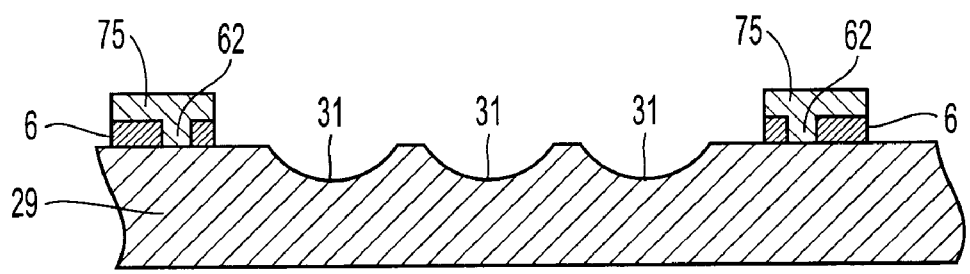

In process <5A>, next, the mask layer 6 is removed as shown in FIG. 3(e). In this operation, the back side protection layer 69 is also removed by the mask layer 6. This can be done by means of erosion (wet etching) into peeling liquids (remover) such as alkali aqueous solution (for instance, tetra methyl ammonium hydroxide), hydrochloric acid+nitric acid solution, hydrofluoric acid solution, or with dry etching with CF gas or chloride gas, etc.

Especially, if the mask layer 6 and the back side protection layer 69 are removed by erosion of the first glass board 29 in the remover, the mask layer 6 and the back side protection layer 69 can be removed effectively in a simple operation. In this stage, in the area where the protection layer 75 has been formed, the protection layer 75 protects the mask layer 6, whereby the mask layer is not removed and remains on the glass substrate 5.

In process <6A>, next, the protection layer 75 is removed. This can be accomplished by wet etching using a mixed solution of hydrochloric acid and nitric acid, alkali aqueous solution as a peeling liquid. This makes the area protected with the protection layer 75 on the mask layer 6 exposed as the first alignment mark 71 as shown in FIG. 3(f).

Figure 3F:
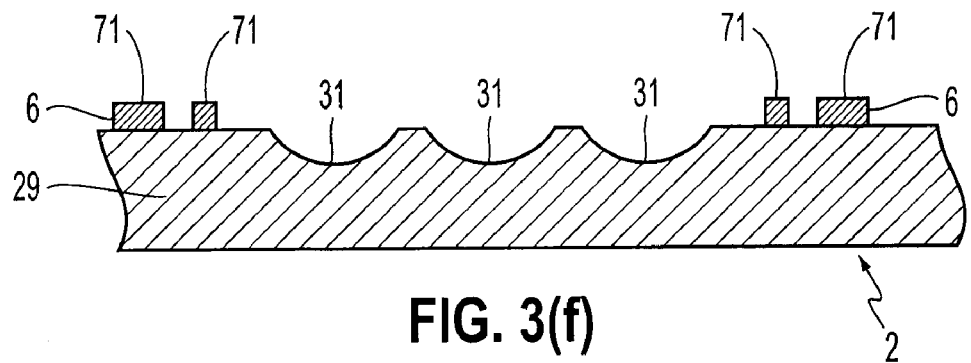

As described heretofore, as shown in FIG. 3(f), the first concave micro-lens substrate 2 where many of the first concaves and the first alignment mark are formed in the fixed position is prepared on the first glass substrate 29.

In this manner, as the first alignment mark 71 is formed with a partial area remaining, the first alignment mark can be formed at the same time as the first concave is formed. Therefore, the number of steps can be reduced in manufacturing first concave micro-lens substrate 2.

Of course, the first alignment mark 71 can be formed in another process independently of that of a process where the first concave is formed.

The second concave micro-lens substrate 8 where the second concave 32 and the second alignment marks 72 are formed on the second glass substrate 89 can be manufactured or prepared in the same manner as the first concave micro-lens substrate 2.

In manufacturing the second concave micro-lens substrate 8, the area of opening 61 made in the process, or at least of one of etching conditions (for instance, etching duration, etching temperature, composition of etching liquid etc.) should be different from the conditions when manufacturing the first concave micro-lens substrate 2. As described, having conditions for manufacturing the second concave micro-lens substrate 8 which is partially different from those for manufacturing the first concave micro-lens substrate 2, it is easier to make the curvature radius of the first concave different from the curvature radius of the second concave.

Using such a first concave micro-lens substrate 2 and a second concave micro-lens substrate 8, micro-lens substrate 1A can be manufactured in the following manner.

Figure 4:
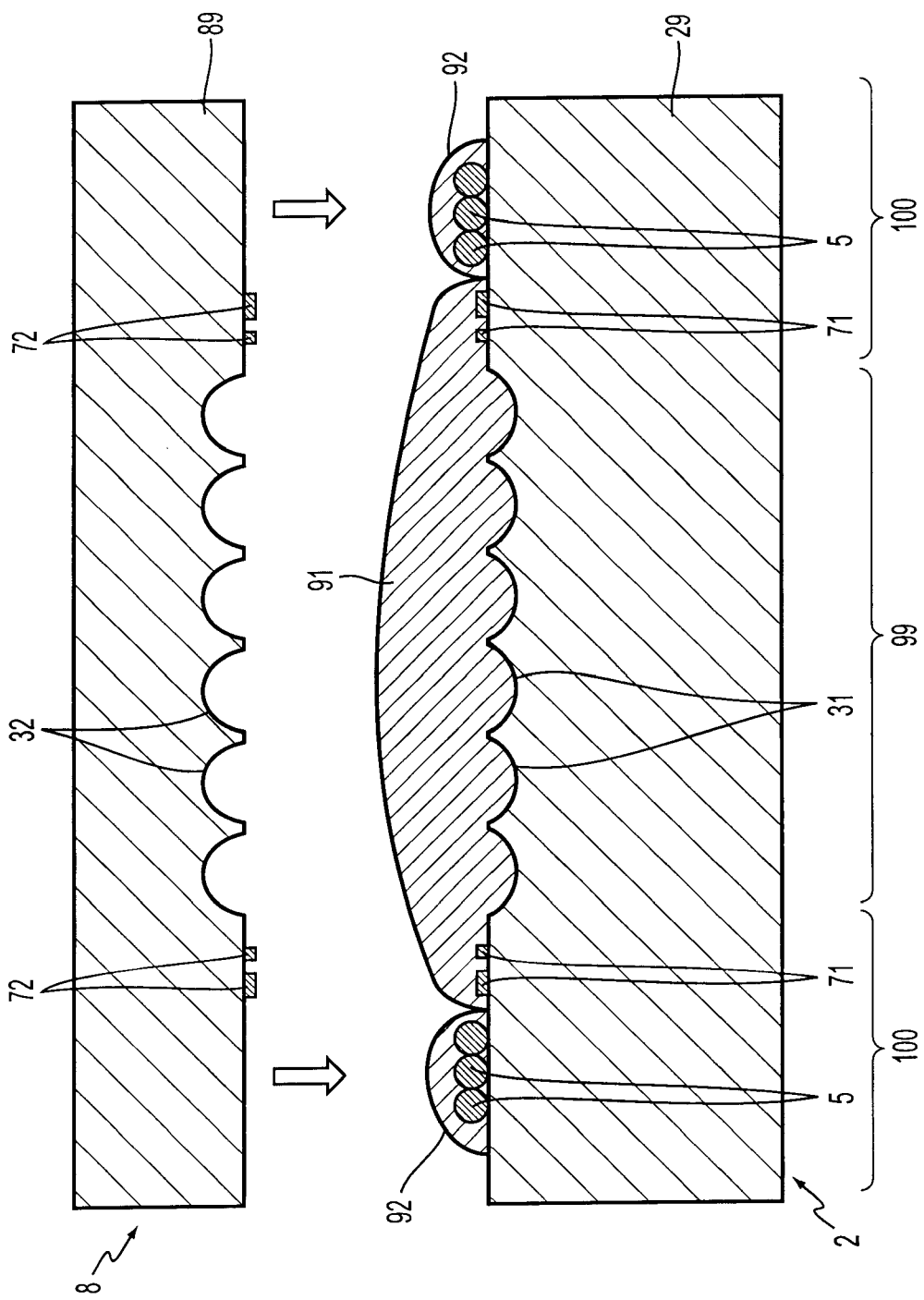
FIG. 4 is a drawing to explain the manufacturing method of the micro-lens board related to the present invention.

In process <7A>, next, as shown in FIG. 4, uncured resin 91 with a fixed refractive index (especially a higher refractive index than the refractive index of the first glass substrate 29 and the second glass substrate 89) is provided on the surface where the first concave 31 of the first concave micro-lens substrate 2 is formed so that it covers at least an active lens area 99. The concave 31 is filled with resin 91. In this operation, uncured resin 92 containing spacer 5 is supplied on the first concave micro-lens substrate 2. Resin 92 is provided to the area where the spacer 5 is placed.

Resin 92 preferably contains 1~50 wt % of spacer 5, more preferably 5~40%. If the content of spacer 5 falls within this range, the thickness of the resin layer 9 can be controlled with high accuracy and with the deterioration of the adhesive properties of the resin being suppressed.

Resin 91 and resin 92 are preferably made of the same material. This can prevent a microlens substrate 1A that is formed from warping or flexing because of the difference of the thermal expansion coefficient between resin 91 and resin 92.

In the operation of providing resin 92 onto the first concave micro-lens substrate 2, a spacer is preferably dispersed in the resin 92. Dispersion of the spacer 5 in resin 92 makes it easier to accomplish uniform disposition of spacers 5. This desirably suppresses inconsistency in the thickness of the resin layer 9 that is formed.

If a spacer is particulate as in the spacer 5 of the embodiment according to the present invention, it can prevent the deterioration of the adhesive properties between the resin and the substrate. Further, if the spacer is particulate, it is easier to disperse the spacer 5 in the resin 92.

If the spacer is a spherical particulate, as in spacer 5, it can prevent the spacer from becoming stacked with each other. This enables the enhancement of the accuracy in defining a thickness of resin layer 9. This can suppress inconsistency of the thickness of the resin layer 9 extremely well.

The average particle size of the spacer 5 can be substantially the same as the thickness of the resin layer 9. The standard deviation of the particle size distribution of the spacer 5 should be within 20% of the average particle size of the spacer 5, preferably within 5%. This allows inconsistency in the thickness of the resin layer 9 to be better suppressed.

When a density for spacers 5 is set to r1 (g/cm$^3$) and a density for a resin that forms the resin layer (e.g., density of a cured resin) is set to r2 (g/cm$^3$), a ratio of r1/r2 is preferably in the range of 0.6 to 1.4, more preferably in the range of 0.8 to 1.2. This allows the spacer 5 to be dispersed more uniformly in the resin 92. Thus, inconsistency in the thickness of the resin layer 9 is better suppressed.

Resin 91 and 92 can be provided on the second concave micro-lens substrate 8. Also, resin 91 and 92 can be provided on both the first concave micro-lens substrate and the second concave micro-lens substrate.

In the micro-lens substrate 1A of the embodiment of the present invention, the spacer 5 is a spherical particulate. However, spacer is not necessarily a spherical particulate. It can be a cicular, rhabdom, ellipsoidal, or oval. Moreover, the spacer is not necessarily particulate. It can be a sheet type or fiber type, for instance.

In process <8A>, next, as shown in FIG. 4, the second concave micro-lens substrate (counter part) 8 is placed on the resin 91 and 92 (the second concave micro-lens substrate is glued with resin).

At this time, the second concave micro-lens substrate 8 is placed on the resin so that the first concave 31 and the second concave 32 face each other. Also, the second concave micro-lens substrate 8 is placed on the resin so that the second concave micro-lens substrate 8 makes contact with spacer 5.

Thus, the spacer 5 can define a distance between the end surfaces where the first concave micro-lens substrate 2 and the second concave micro-lens substrate 8 face each other. Therefore, the Koba thickness and the maximum thickness of the micro-lens 4 can be defined with high accuracy.

In process <9A>, next, positioning of the first concave and the second concave is accomplished by using the first alignment mark and the second alignment mark. This permits positioning the second concave 32 exactly at the position corresponding to the first concave 31. This makes the shape of micro-lens 4 that is being formed, and its optical properties to be closer to design values.

Alignment can be made in a manner so as to move the second concave micro-lens substrate relative to the first concave micro-lens substrate 2, for instance, so that the first alignment mark 71 and the second alignment mark 72 overlap each other on the plane, or so that a distance between the first alignment mark and the second alignment mark is fixed.

If a spacer 5 is a spherical particulate as in the embodiment of the present invention, the spacer 5 works like a roller when aligning. This makes it easier to move the second concave micro-lens substrate 8 in a direction parallel to the first concave micro-lens substrate 2 when aligning.

In process <10A>, next, resin 91 and resin 92 are cured to form a resin layer 9.

Thus, the second concave micro-lens board 8 is bonded to the first micro-lens substrate 2 through the resin layer 9. Among resins of which the resin layer 9 is made, the micro-lens 4 is formed of a resin that is filled in the gap between the first concave 31 and the second concave 32.

The curing of a resin can be accomplished, for example, by the radiation of ultraviolet light or an electron beam onto the resin or by heating the resin.

Figure 5:
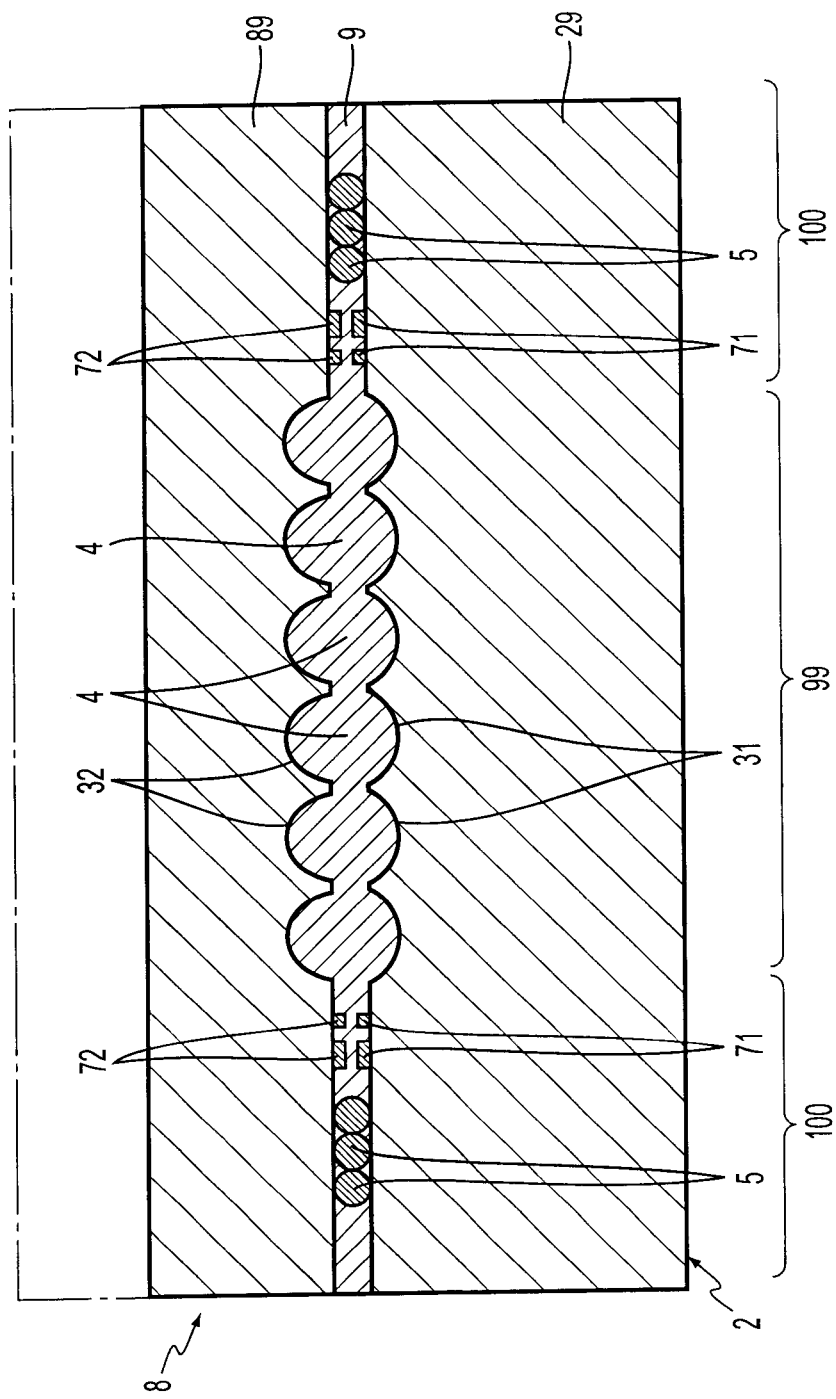
FIG. 5 is a drawing to explain the manufacturing method of the micro-lens board related to the present invention.

In process <11A>, subsequently, if necessary, as shown in FIG. 5, the thickness of the second concave micro-lens board 8 can be adjusted by grinding or polishing.

This results in the micro-lens substrate 1A shown in FIG. 1.

If the micro-lens substrate 1A is manufactured in this manner, micro-lens substrate can be manufactured in relatively few process steps.

The manufacturing method of the second micro-lens substrate 1B is explained hereafter. In the following explanation, description of the features in common with the first micro-lens substrate 1A will be omitted.

In the manufacturing method of a micro-lens substrate 1B, the micro-lens 4 and the first resin layer 95 are formed by the 2P method using the second concave micro-lens substrate 8 as a mold material.

At first, as described previously, the first concave micro-lens substrate 2 and the second concave micro-lens substrate 8 are prepared (see the processes described previously). Prior to performing the following steps, separation treatment can be performed by coating the surface of the second concave micro-lens board 8 with a mold release agent.

In process <5B>, next, the same process as the process is implemented.

In process <8B>, next, as shown in FIG. 4, the second concave micro-lens substrate 8 is disposed on resins 91 and 92 as a mold material.

In process <9B>, the same process as the process <9A> is implemented.

In process <10B>, the same process as the process <10A> is implemented, resulting in the formation of the first resin layer 95 and the micro-lens 4.

Figure 10:
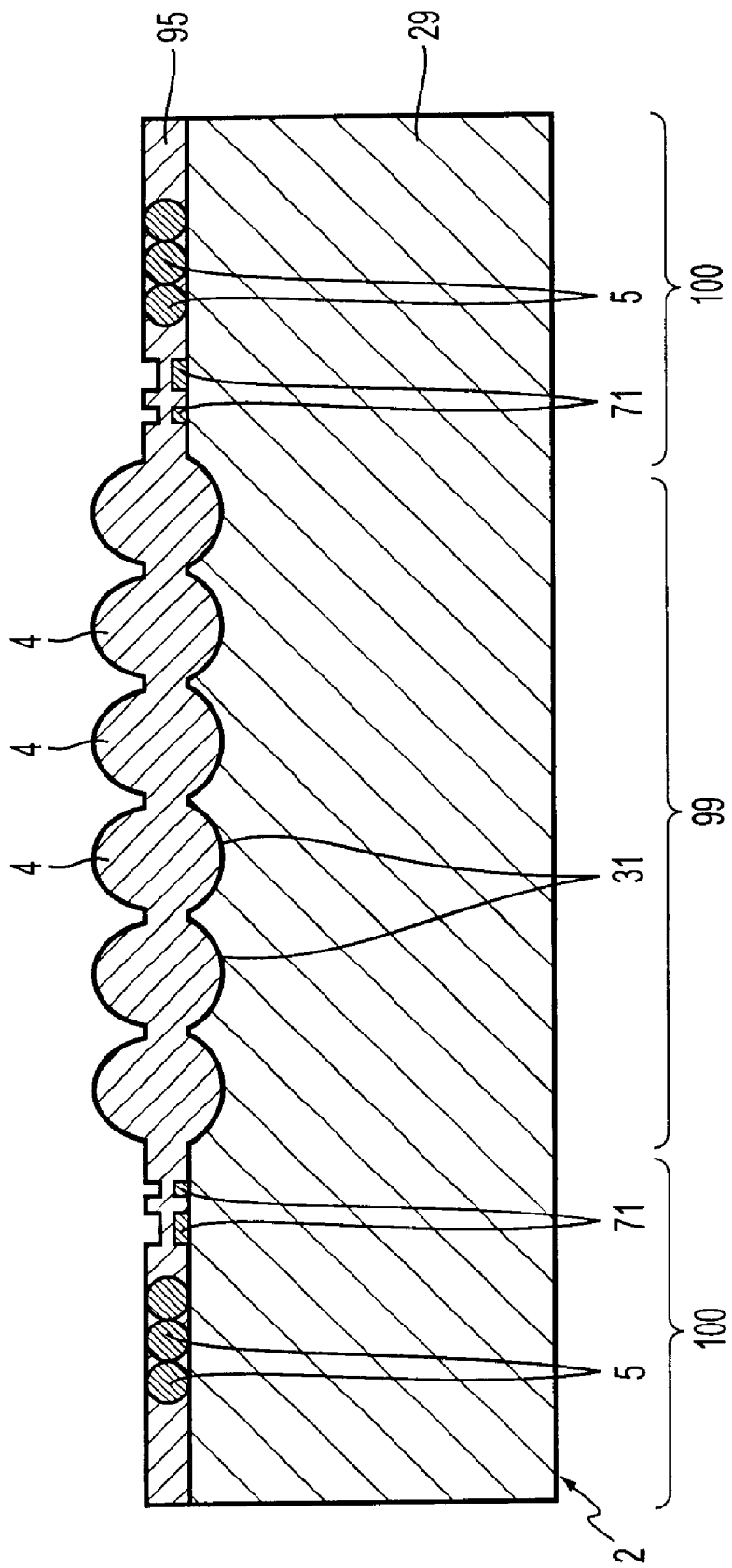
FIG. 10 is a drawing to explain the manufacturing method of the micro-lens board related to the present invention.

In process <11B>, next, as shown in FIG. 10, the second concave micro-lens substrate (mold material) 8 is separated from the first resin layer 95.

In process <12B>, next, the glass layer 8' is bonded onto the first resin layer 95 via the second resin layer 96.

Specifically, this process is executed in the following manner. First, uncured resin is placed on the first resin layer 95, forming the second resin layer. Then, the glass layer 8' is conjugated onto the uncured resin. Then, the resin is cured to form a second resin layer 96d.

If the first resin layer 95 is made of ultraviolet cured resin, the manufacturing equipment for a micro-lens substrate 1B can be simplified when the second resin layer is also made of ultraviolet cured resin.

In process <13B>, next, if necessary, grinding or polishing can be conducted to adjust the thickness of the glass layer 8'.

In this manner, the micro-lens substrate 1B shown in FIG. 8 can be obtained.

In the manufacturing method of the micro-lens substrate 1B described here, the second concave micro-lens substrate 8 is used as a mold material, but needless to say, any material different from the mold material used for the second concave micro-lens substrate 8 may be used as long as the micro-lens 4 can be formed.

The manufacturing method of a micro-lens substrate 1C will be explained next. In the following explanation, description of the features in common with the manufacturing method of a micro-lens substrate 1A, 1B will be omitted. In the manufacturing method of the micro-lens substrate 1C explained hereafter, the second concave micro-lens substrate 9 and the glass layer 8' are used as the mold material, and the micro-lens 4, the first resin layer 95 and the second resin layer 96' are formed.

At first, in the same way as described earlier, the first concave micro-lens substrate 2 and the second concave micro-lens substrate 8 are prepared (see the steps <1A> to <6A>). Prior to performing the following steps, a mold separation process may be implemented, for example, by applying a mold release agent to the surfaces of the second micro-lens substrate with the concave 8 and the glass layer 8'.

As in process steps <7C>~<12C>, next, the same process as <7B>~<12B> is implemented.

Figure 11:
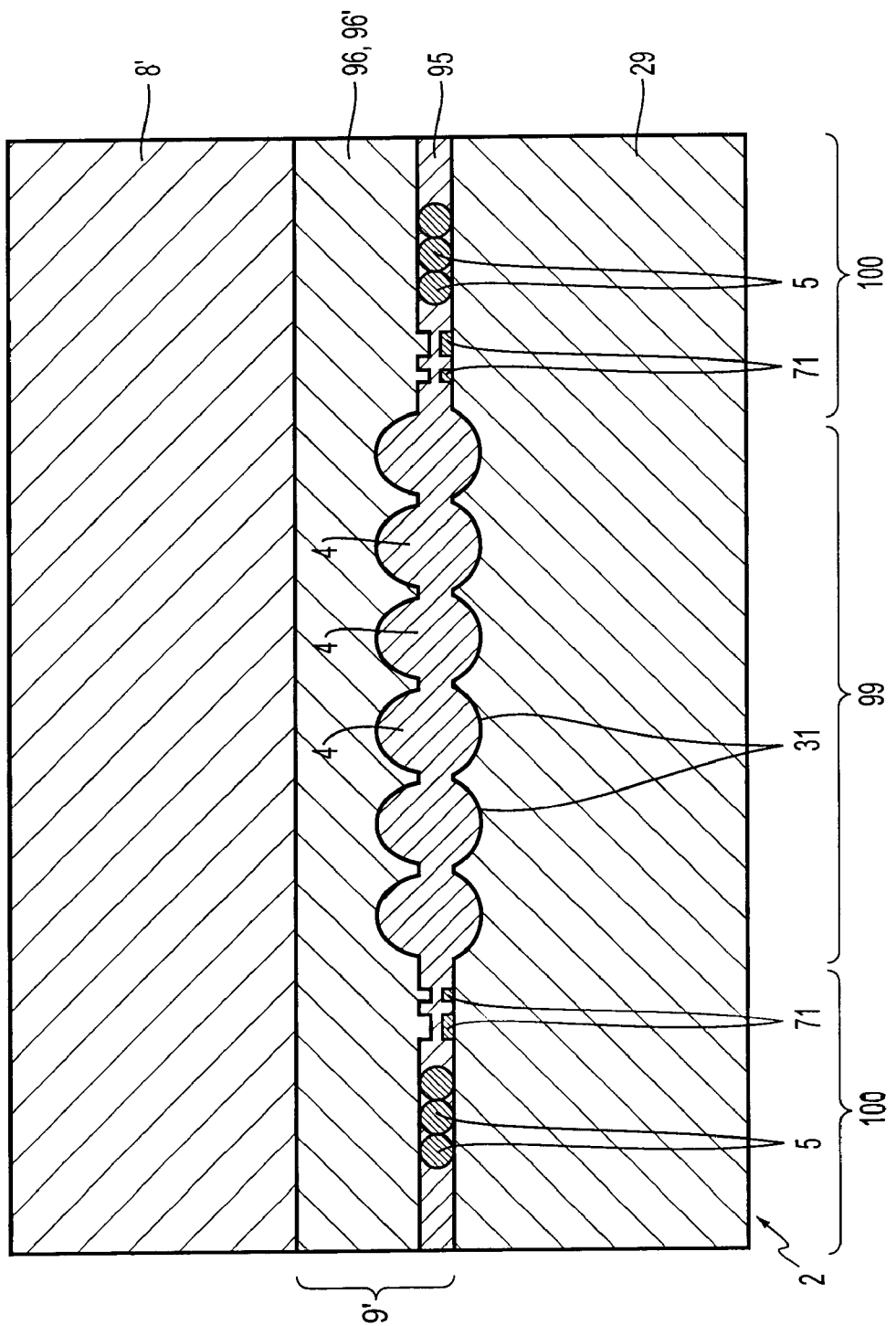
FIG. 11 is a drawing to explain the manufacturing method of the micro-lens board related to the present invention.

The second resin layer is formed on the first resin layer as shown in FIG. 11 through this process, and the second mold material (glass layer 8') is bonded onto the second resin layer 96'.

In process <13C>, subsequently, the glass layer 8' is separated from the second resin layer 96'.

Micro-lens substrate 1C can be obtained as shown in FIG. 9 through this process.

In the manufacturing method of the micro-lens substrate 1C described here, the glass layer 8' is used for the second mold material, but needless to say, any mold material different from the mold material of glass layer 8' can be used for the second mold material, as long as the second resin layer can be formed.

The micro-lens board of the present invention, can be used in applications other than opposing substrates for a liquid crystal panel and liquid crystal panels. For example, various electro-optical devices such as CCDs and optical communication devices, and other devices.

In the following explanation, the micro-lens substrate 1A is described as a representative embodiment of the present invention.

Figure 6:
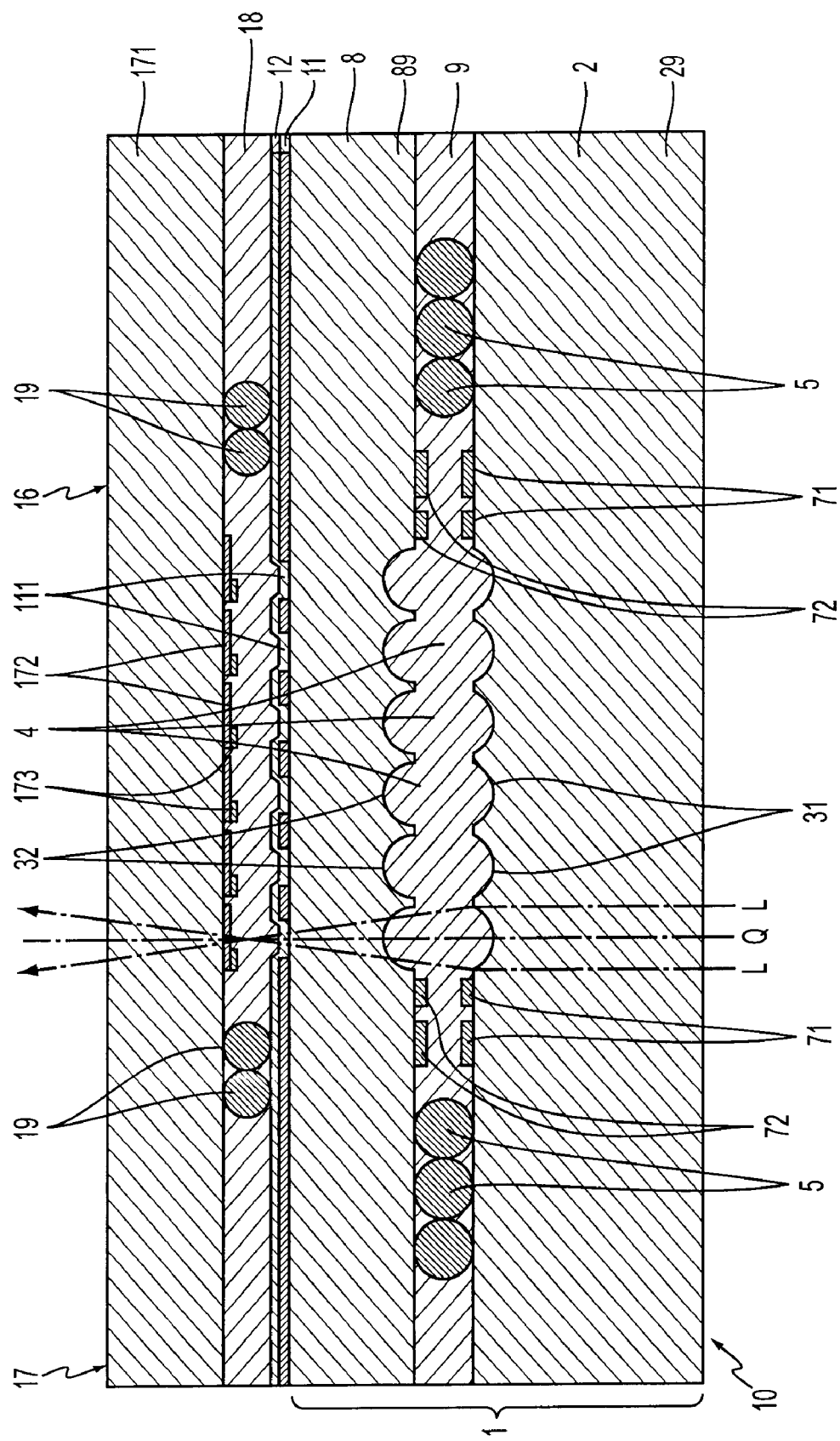
FIG. 6 is a drawing of typical longitudinal section showing the embodiment of the liquid crystal panel related to the present invention.

An opposing substrate for a liquid crystal panel 10 can be manufactured, for instance, by forming a black matrix (light shielding layer) having an opening 111 is formed on the second concave micro-lens substrate of the micro-lens substrate 1A, and then forming a transparent electro-conducting film (conductive film) so that it covers the black matrix (see FIG. 6).

The black matrix 11 and transparent conductive film 12 can be arranged on the first concave micro-lens substrate 2 instead of the second concave micro-lens substrate 8.

The black matrix 11 has a light shielding function, and is made of a metal such as Cr, Al, Al alloy, Ni, Zn, and Ti, or a resin in which carbon or titanium is dispersed.

The transparent conductive film 12 has a conductivity, and is made of indium tin oxide, indium oxide and tin oxide, for example.

The black matrix 11 can be prepared in such a manner that a thin layer which serves as the black matrix 11 is made by a vapor phase film developing methods (vapor deposition, sputtering for instance), then a resist film having the pattern of the openings 111 is formed on the thin layer, the opening 111 are formed on the thin layer by means of wet etching, and the resist film is removed.

In forming the opening 111, aligning the micro-lens 4 with the opening 111 can be accomplished using the first alignment mark 71 and the second alignment mark 72. A transparent conductive film 12 can be made by a vapor phase film developing method such as vapor deposition and sputtering.

An opposing substrate for a liquid crystal panel can be obtained by forming a black matrix and a transparent conductive film on a micro-lens substrate. It is not always necessary to provide a black matrix 11.

A liquid crystal panel (electro-optic device) in which such an opposing substrate is used is explained hereafter, with reference to FIG. 6.

As shown in FIG. 6, the liquid crystal panel of the present invention (a liquid crystal panel shown here has thin film transistors, TFTs) 16 comprises a TFT substrate (liquid crystal drive substrate) 17, an opposing substrate for liquid crystal panel 10 bonded to the TFT substrate 17, a second spacer to define the distance between the TFT board 17 and the opposing substrate for the liquid crystal panel 10, a liquid crystal layer 18 composed of liquid crystal filling in the gap between the TFT substrate 17 and the opposing substrate for liquid crystal panel 10.

The opposing substrate for liquid crystal panel 10 is placed on a micro-lens substrate 1A and a second concave micro-lens substrate 8 of the micro-lens substrate 1A, and it has a black matrix 11 where an opening 111 is formed and a transparent conductive film 12 (common electrode) provided on the second concave micro-lens substrate 8 so as to cover the black matrix 11.

The TFT substrate 17 is a substrate for driving the liquid crystal of the liquid crystal layer 18. The TFT substrate 17 has a glass substrate 171, plural (many) pixel electrodes 172 which are placed on the glass substrate 171 and disposed in a matrix, and plural (many) thin film transistors (TFTs) 173 corresponding to respective pixel electrodes 172. It should be noted that in the figure, seal materials, alignment films and wirings are omitted.

In the liquid crystal panel 16, the TFT substrate 17 and the opposing substrate for liquid crystal panel 10 are bonded to each other via the second spacer 19 at a fixed distance apart so that transparent conductive film 12 of the opposing substrate for liquid crystal panel 10 and the pixel electrodes 172 of the TFT substrate 17 face each other. Surfaces of the TFT substrate 17 and the opposing substrate for liquid crystal panel 10 facing each other make contact with the second spacer 19.

The glass board 171 is preferably made of fused silica for the reason described previously.

The pixel electrode 172 drives the liquid crystal of the liquid crystal layer 18 by conducting a charge and discharge with the transparent conductive film. The pixel electrode 172 is made of the same material as the transparent conductive film 12 described previously, for example.

The thin film transistor 173 is connected to the adjacent corresponding pixel electrode 172. The thin film transistor 173 is connected to a control circuit, not shown, and controls the supplied electric current to pixel electrode 172. In this way, charging and discharging pixel electrode 172 are controlled.

The liquid crystal layer 18 contains liquid crystal molecules (not shown in the drawings). The orientation of the liquid crystal molecules, namely the liquid crystal, changes in response to the charge and discharge of the pixel electrode 172.

In the liquid crystal panel 16, the spacer 5 micro-lens substrate 1A should have the different physical properties (for instance, at least any one among elasticity modulus, hardness, Poisson's ratio, gravity) from the second spacer 19. The spacer 5 is in contact with a material whose properties are different from those of a material with which the second spacer 19 is in contact. Also, spacer 5 and the second spacer 19 have a different objective and function, respectively. Moreover, the process required for manufacturing is different between spacer 5 and the second spacer 19. Therefore, possibly each spacer with the best properties can be provided in accordance with each objective, function and role, if the physical properties of spacer 5 and physical properties of the second spacer 19 are different.

In particular, the elasticity modulus of spacer 5 (elasticity modulus of the material of spacer 5) is preferably lower than the elasticity modulus of the second spacer 19 (elasticity modulus of the material of the second spacer 19). This improves the consistency in the thickness of the liquid crystal layer 18. This is due to the following mechanism. When manufacturing the liquid crystal panel 16, the TFT substrate 17 and the opposing substrate for liquid crystal panel are bonded to each other. At this time, the TFT substrate 17 applies a force against the opposing substrate for liquid crystal panel 10, or the opposing substrate for liquid crystal panel 10 applies a force against the TFT substrate 17. In this case, it is ideal that the direction of stress added to the TFT substrate 17 and the opposing substrate for liquid crystal panel 10 exactly matches the normal line of each substrate. But in reality, in some cases, the added stress on these substrates deviates from the normal line even though the deviation is very small. In this case, if the elasticity modulus of the spacer 5 is lower than the elasticity modulus of the second spacer 19, spacer 5 shrinks and the shrinkage of the second spacer 19 is suppressed. As a result, the deterioration of the consistency of the thickness of the liquid crystal layer 18 can be prevented. If the consistency of the thickness of the liquid crystal layer 18 is high, variations in the brightness of the formed image is substantially suppressed, providing the advantage of improved visibility.

From the point of view of obtaining this effect more remarkably, the elasticity modulus of the material of spacer 5 is preferably in the range of 40–800 kgf/mm2 even though there should be a small variation due to the physical properties of the second spacer 19 or the like.

In such a liquid crystal panel 16, usually, one micro-lens 4, one opening 111 of the black matrix corresponding to the optical axis Q of the micro-lens 4, one pixel electrode 172 and one thin film transistor 173 connected to the pixel electrode 172 correspond to one pixel.

Incident light L falling on the side of the opposing substrate for liquid crystal panel 10 passes the first concave micro-lens substrate 2, and is condensed 30 when passing through the micro-lens 4, and is transmitted through the resin layer 9, the second concave micro-lens board 8, opening 111 of black matrix 11, the transparent conductive layer 12, the liquid crystal layer 18, the pixel electrode 172, and glass substrate 171. As usually a polarizing plate is arranged (not shown in the drawing) on the side where light falls on, incident light L is linearly polarized when passing through the liquid crystal layer 18. At that time, the polarization direction of this incident light L is controlled in response to the orientation status of the liquid crystal molecules of the liquid crystal layer 18. Therefore, the brightness of emergent light can be controlled by transmitting the incident light L that passed through the liquid crystal panel 16 through the polarizing plate (not shown in the drawing).

In the manner described above, with the liquid crystal panel 16, incident light 16 passing through micro-lens 4 is condensed, and passes through the opening 111 of the black matrix 11. Therefore, the liquid crystal panel 16 can form bright and clear images with a relatively small amount of light. Further, since the micro-lens substrate 1A is provided with the micro-lens 4 which has the previously described physical properties, the liquid crystal panel 16 can form images with a high contrast ratio.

The liquid crystal panel 16 can be manufactured in such a manner that, for example, after conducting alignment treatment of the TFT board 17 and the opposing substrate for liquid crystal panel 10 manufactured by a known method, they are bonded to each other via the second spacer 19 and sealing material (not shown in the drawing), and then, the liquid crystal is filled in the gap through the filling hole of the gap formed between them (not shown in the drawing), and finally, the hole for filling is plugged. Afterward, if necessary, polarizing plates can be placed on the incident side or the emergent side of the liquid crystal panel 16.

When the opposing substrate for liquid crystal panel 10 and the TFT substrate 17 are bonded to each other, aligning of the opposing substrate for liquid crystal panel 10 with the TFT substrate 17 may be made using the second alignment mark 72.

In the described liquid crystal panel 16, the TFT substrate is used for the liquid crystal drive substrate, but other liquid crystal drive substrate than a TFT substrate, such as a TFD substrate and an STN substrate, can be used for the liquid crystal drive substrate.

A projection type display device using the liquid crystal panel described above will be explained next.

Figure 7:
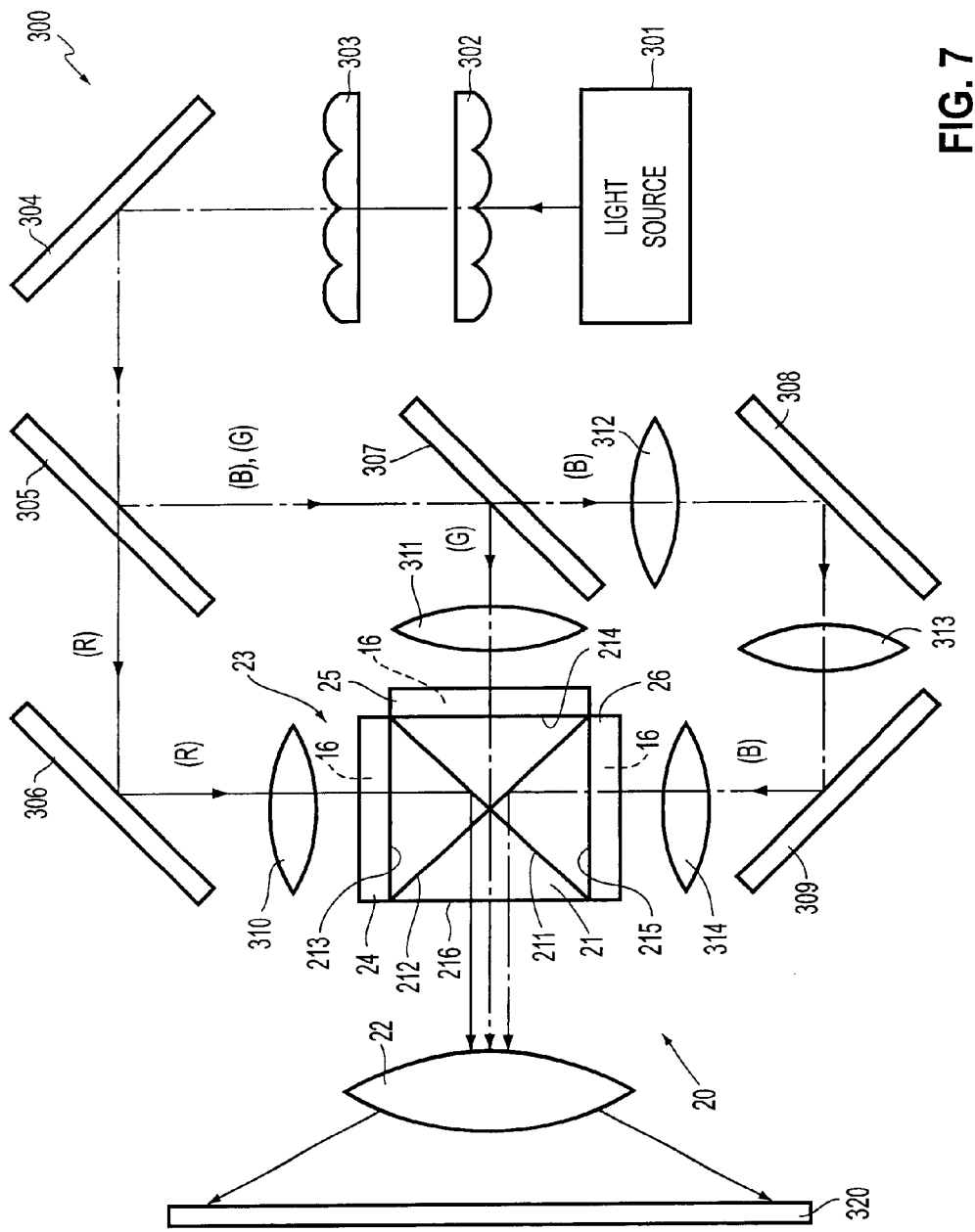
FIG. 7 is a schematic drawing showing the optical system of the projection type display device related to the present invention.

FIG. 7 is a drawing that typically shows the projection display device of the present invention.

As shown in the drawing, a projection type display device 300 comprises a light source 301, an optical illumination system having plural integrator lenses, a color separation optical system (light-guiding optical system), a liquid crystal light valve (for red color, liquid crystal light shatter array) corresponding to red color 24, a liquid crystal light valve (for green color, liquid crystal light shatter array) corresponding to green color 25, a liquid crystal light valve (for blue color, liquid crystal light shatter array) corresponding to blue color 26, dichroic prism (color synthesis optical system) 21 on which the mirror surface 211 that reflects only red light 211 and the mirror surface 212 that reflects only blue light are formed, and a projection lens (projection optical system) 22.

The optical illumination system has integrator lenses 302 and 303. The color separation optical system has mirrors 304, 306, 309, a dichroic mirror 305 that reflects blue color light and green color light (transmitting only red color light), a dichroic mirror 307 that reflects only green color light, dichroic mirror 308 (or mirror that reflects blue color light), and condenser lens 310, 311, 32, 313, 314.

The liquid crystal valve 25 comprises liquid crystal panel 16, the first polarizing plate (not shown in the drawing) bonded to the light-incident side of the liquid crystal panel 16 (the side where the micro-lens substrate is located, namely, the opposite side of the dichroic prism 21) and the second polarizing plate (not shown in the drawing) bonded to the light-emergent side of the liquid crystal panel 16 (the side that faces the micro-lens substrate, namely, the side of dichroic prism 21). Liquid crystal valves 24 and 26 have the same construction as the liquid crystal valve 25. The liquid crystal panel 16 that is provided respective liquid crystal light valves 24, 25, 26 is connected to a drive circuit not shown in the drawing.

In a projection type display device, an optical block is constructed with a dichroic prism 21 and a projection lens 22. The display unit 23 is constructed with the optical block 20 and liquid crystal light valves 24, 25, 25 placed on the dichroic prism 21 in a fixed manner.

Operation of a projection type display device will be explained next. White color light emitted from the light source 301 (white beam of light) passes through integrator lenses 302 and 303. The light intensity (luminance distribution) is made uniform by the integrator lenses 302 and 303.

The white color light passing through the integrator lenses 302 and 303 is reflected onto the center-left side in FIG. 7 at mirror 304. The blue color light (B) and the green color light (G) of the reflected light are reflected respectively onto the center-bottom side in FIG. 7 at the dichroic mirror 305, and the red color light (R) passes through the dichroic mirror.

The red color light passing through dichroic mirror is reflected onto the center bottom side in FIG. 7 at mirror 6. The reflected light is shaped by condenser lens 310 and enters the liquid crystal light valve 24 for the red color.

The green color light out of the blue color light and the green color light reflected by the dichroic mirror 305 is reflected onto the center left side in FIG. 7 at the dichroic mirror 307 and the blue color light passes through the dichroic mirror 307.

Green color light reflected at the dichroic mirror 307 is shaped by the condenser lens 311 and enters the liquid crystal light valves 25 for the green color. The blue color light passing through dichroic mirror 307 is reflected onto the center-left side in FIG. 7 at dichroic the mirror (or mirror) 308. And the reflected light is reflected onto center upper side in FIG. 7 at the mirror 309. The blue color light is shaped by condenser lens 312, 313 and 314 and enters the liquid crystal light valve 2 for the blue color light.

The white color emitted from the light source 301 is separated by a color separation optical system into three primary colors, namely, red, green, and blue, and each color is guided to the corresponding liquid crystal light valve and enters.

Each pixel (thin film transistor 173 and pixel electrode 172 connected to the transistor) of liquid crystal panel 16 of the liquid crystal light valve is switch-controlled (ON/OFF), namely, modulated by the drive circuit (drive means) operated based on imaging signals for red color.

In the same manner, green color light and blue color light enter the liquid crystal light valves 25, 26, respectively and are modulated by each liquid crystal panel 16.

This forms images for the green color and for the blue color.

In this process, each pixel of liquid crystal panel 16 of the liquid crystal light bulb 25 is switch controlled by a drive circuit operated based on the image signals for the green color. Each pixel of liquid crystal panel 16 of liquid crystal light bulb 26 is switch controlled by a drive circuit operated based on the image signals for the blue color.

Through this process, the red color light, green color light and blue color light are modulated respectively by the liquid crystal light valves 24, 25 and 26, forming images for the red color, green color and blue color.

Images for the red color formed by the liquid crystal light valve 24, namely, red color light from the liquid crystal light valve 24 enters the dichroic prism 21 from the face 213, is reflected onto the center left side in FIG. 7 at the dichroic mirror 211, and passed through dichroic mirror face 212, and goes out from the emergent surface 216.

Images for the green color formed by the liquid crystal light valve 25, namely, the green light from the liquid crystal light valve 25 enters the dichroic prism 21 from the face 214, passes through the dichoric mirror faces 211 and 212, goes out from the surface 216.

Images for the blue color formed by the liquid crystal light valve 26, namely, the blue color light from the liquid crystal light valve 26 enters the dichroic prism 21 from the face 215, is reflected onto the central left side in FIG. 7 at the dichroic mirror face 212, passes through the dichroic mirror surface 211, and goes out from the surface 216.

As described above, each color light coming from the liquid crystal light valves 24, 25, 26, namely, each image formed by liquid crystal light vales 24, 25, 26 is synthesized by the dichroic prism, whereby the color images are formed. These images are projected (enlarged projection) onto screen 329 placed at a fixed position by the projection lens 22.

Since projection type display device 300 has a liquid crystal panel 16 provided with the micro-lens substrate 1A, it is possible to project images with a high contrast ratio.

The micro-lens substrate is manufactured as follows. At first, the first substrate with concave for micro-lens is manufactured in the following manner.

At first, a raw fused silica substrate (the first glass substrate) with 1.2 mm thickness (T1) and rectangle in shape is prepared as the base material. Next, this fused silica substrate is immersed in a cleaning liquid (a mixed liquid of sulfuric acid and hydrogen peroxide) at 85 C. for cleaning, and the surface is cleaned. A polycrystalline silicon film (mask layer and back side protection layer) with 0.4 micrometer in thickness is formed on the front and back surface by the CVD method. This is done in a manner such that fused silica is placed at 600 C. under 80 Pa established in CVD furnace with $SiH_4$ supplied at 300 mL/min.

Next, openings (opening and the second opening) are formed on the polycrystalline silicon film that has been formed, and the area of the opening is set to 9.5 square micrometers. This is achieved in the following manner. First, a resist layer having a pattern with concaves to be formed is formed on the polycrystalline film, then dry etching treatment of polycrystalline silicon film is accomplished with CF gas to form the opening, and the resist layer is subsequently removed.

Next, on the polycrystalline silicon film and fused silica glass substrate and on the part where the alignment mark (the first alignment mark) is to be formed, an Au/Cr thin film (protection layer) with 0.2 micrometer in thickness and the corresponding shape to the alignment mark is formed.

This is accomplished as follows. Au/Cr thin film is formed by the sputtering method on polycrystalline silicon film. The sputtering method is performed with 5 mTorr as the sputter pressure of the sputter furnace and a power of 500 W. Next, on the Au/Cr thin film a resist layer with the corresponding shape to the alignment mark is formed. Then wet etching treatment of the Au/Cr thin film is conducted with a mixed liquid of sulfuric acid and hydrochloric acid, following which the resist layer is removed.

Next, fused silica glass substrate is immersed in the etching liquid (mixed aqueous solution by 10% of hydrofluoric acid+10% of glycerin) for 148 min. as etching treatment to form the concaves (the first concaves) on the fused silica substrate.

Next, fused silica glass substrate is immersed in a solution of 15% tetra-methyl ammonium hydroxide to remove the polycrystalline silicon film formed on the front surface and back surface of the fused silica glass substrate.

Next, the fused silica glass substrate is immersed in a mixed solution of sulfuric acid and hydrochloric acid to remove the Au/Cr thin film.

Through this process, a substrate with concave for micro-lens (a first concave microlens substrate) having an alignment mark (a first alignment mark) and a plurality of concaves (first concaves) formed on the silica glass substrate. The curvature radius of the first concave (R1) is 15 micrometers.

Except for the area where the opening is 9.5 square micrometers in process -2- and the etching time in process -4- is changed to 98 min., the second concave micro-lens substrate is manufactured in the same way as described previously. The curvature radius of the second concave (R2) is 11 micrometers.

Next, the first concave microlens substrate is coated with uncured ultraviolet curing type acryl optical adhesive (refractive index 1.59, density after curing 1.18 $g/cm^3$) without air bubbles using a dispenser, except the area where the spacer is placed on the surface on which the first concaves are formed.

Next, the area of the first concave microlens substrate where the concaves are not formed is coated with an adhesive with spacers being dispersed uniformly using a dispenser.

The adhesive is the same as the one used in the -7.1-. The content of the spacer in the adhesive is 10 wt %. Fine spherical plastic particle is used for the spacer. The average particle size of this spherical particle is 10 micrometers, the standard deviation of the particle size diameter distribution is 4.6% of the average diameter, the gravity is 1.19 $g/cm^3$, and the elastic modulus is 480 $kgf/mm^2$.

Next, the second concave micro-lens substrate is bonded to the surface of the first concave micro-lens substrate that is coated with a resin. At this time, pressure is applied uniformly across the second concave micro-lens substrate to bring the second concave micro-lens substrate into contact with the spacer.

Next, alignment between the first concaves and the second concaves is performed using the first alignment mark and the second alignment mark.

Next, a ultraviolet beam is irradiated to cure the resin to form the resin layer and the micro-lens.

The focal distance of the micro-lens that has been formed is 55 micrometers, and the maximum thickness (TM) is 30 micrometers, the Koba thickness (the distance between the end faces where the first concave micro-lens substrate and the second concave micro-lens substrate face each other) is 10 micrometers.

Lastly, the thickness (T2) of the second concave micro-lens substrate is adjusted to 30 micrometers by grinding and polishing to obtain a micro-lens substrate with the structure as shown in FIG. 1.

The micro-lens substrate is formed in the same way as in embodiment 1 except for the features described hereafter.

In the process -1A-, an Au/Cr thin film (mask layer and back side protection layer) is formed by the sputtering method, instead of forming a polycrystalline silicon film. Conditions for film deposition are the same as in the process -3A- in Embodiment 1.

In the process -3A-, a polycrystalline silicon film is formed instead of an Au/Cr thin film (protection film). In this case, conditions for film deposition is the same as in the process -1A- in embodiment 1. Fifteen percent aqueous solution of the tetra methyl ammonium hydroxide is used for the etching liquid for wet etching.

In the process -5A-, fused silica glass board is immersed in a mixed solution of sulfuric acid and hydrochloric acid. As a result, the Au/Cr thin film formed on the front face and back face of the fused silica glass board is removed.

In the process -1A-, the fused silica glass board is immersed in 15% aqueous solution of tetra methyl ammonium hydroxide. As a result, the polycrystalline silicon film is removed.

The micro-lens substrate is prepared in the same way as in the embodiment 1 except for the features described hereafter. At first, as described above, the first concave micro-lens substrate and the second concave micro-lens substrate (mold material) are obtained, and a silicon based mold release agent is applied to the second concave micro-lens substrate surface.

Next, the same processes as the processes -7.1A-, -7.2A-, -8A---10A- are implemented. The thickness of the first resin layer is the same as the thickness of the resin layer of embodiment 1.

Next, the second concave micro-lens substrate is separated from the first resin layer.

Next, an uncured epoxy based resin (refractive index 1.39) is provided on the first resin layer, and then, the cover glass (glass layer) is bonded onto the uncured resin, and the resin is cured.

Through this process, the cover glass is bonded to the first resin layer via the second resin layer.

The thickness of the second resin layer is set to 15 micrometers.

Finally, the cover glass is ground and polished to a thickness (TM) of 33 micrometers to obtain a micro-lens substrate with the structure shown in FIG. 8.

The micro-lens substrate is prepared in the same way as in the embodiment 3 except for the features described hereafter.

Initially, as described above, the first concave micro-lens substrate and the second concave micro-lens substrate (mold material) are obtained, and a silicon-based mold release agent is applied to the second concave micro-lens substrate surface.

Then, the same processes as the processes -7.1A-, -7.2A-, -8A---10A-, -11B-, -12B- are implemented.

The thickness of the second resin layer is set to 41 micrometers. -13C-.

Finally, the cover glass (the second section bar) is separated from the second resin layer to obtain the micro-lens substrate with the structure shown in FIG. 9.

The micro-lens substrate is prepared in the same way as in embodiment 2, except for the features described hereafter.

The curvature radius of the first concave (R1) is set to 12.2 micrometers. The curvature radius of the second concave (R2) is set to 12.2 micrometers. The focal distance of the micro-lens is set to 62 micrometers, and the maximum thickness (Tm) is set to 30 micrometers, the Koba thickness (a distance between the ending faces where the first concave micro-lens substrate and the second concave micro-lens substrate face each other) are set to 10 micrometers.

In the process -2- used in manufacturing the first concave micro-lens substrate and the second concave micro-lens substrate, the area of opening is set to 9.5 square micrometers and the etching time is set as 123 min.

Figure 12:
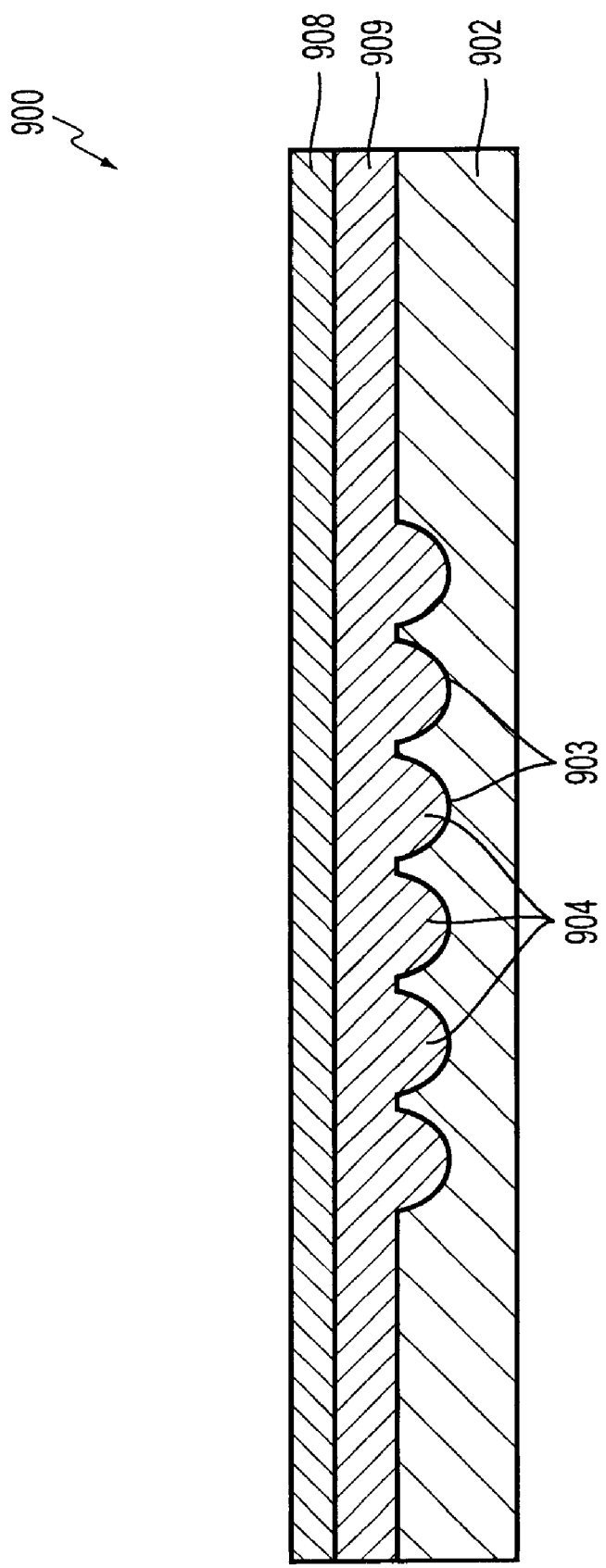
FIG. 12 is a schematic drawing of longitudinal section showing a prior micro-lens board.

A micro-lens substrate with the structure shown in FIG. 12 was manufactured. For this micro-lens substrate, the thickness of the resin layer is 10 micrometers, the thickness of the glass cover is 50 micrometers, and the curvature radius of the concave is 9.5 micrometers. The construction of the glass substrate was basically the same as the construction of the first concave micro-lens substrate.

A micro-lens substrate (comparable to an opposing substrate 120) with the shape shown in FIG. 1 of [Tokukaihei] Publication of Unexamined Patent Application No. Hei 11-24060 was manufactured. In other words, a substrate having a lens system comprising two hemispheric planar convex lenses was fabricated by bonding two substrates on which convex microlenses are formed to each other so that convex portions on each of the two substrates face each other.

Those planar convex lenses were prepared with the dry etching method referred to in Tokukaihei 7-17490.

The substrate on which the planar convex lenses are formed (and the planar convex lenses) were formed were made of fused silica. The curvature radius of the flat convex lenses are each 12.2 micrometers. The thickness of the adhesive layer is 32 micrometers, and the refractive index is set to 1.39.

On each micro-lens substrate manufactured in each embodiment and comparison embodiment, using the sputtering method or the photolithography method, a 0.16 micrometer thick-shielding film (Cr film), namely, a black matrix where the opening (opening ratio:43%) was provided at the position corresponding to the micro-lens of the second concave micro-lens substrate (or cover glass, or micro-lens substrate). Furthermore, a 0.16 micrometer thick ITO film (transparent conductive film) was formed on a black matrix using the sputtering method, and an opposing substrate for liquid crystal panel was manufactured.

Next, a light beam is radiated toward the side of first concave micro-lens board (or the glass substrate side or the opposite side of black matrix), and the brightness of the emergent light is measured in the active lens region of the opposing substrate for liquid crystal panel. The result is shown below. It should be noted that the standard for measuring the brightness of emergent light was set to 100% for cases where a microlens had not been formed.

Embodiment 1: 184%
Embodiment 2: 184%
Embodiment 3: 183%
Embodiment 4: 183%
Embodiment 5: 182%
Comparative embodiment 1: 171%
Comparative embodiment 2: 179%

These results prove that the micro-lens substrate according to the present invention offers higher efficiency of light utilization and higher transmittance. Therefore, if the micro-lens substrate according to the present invention is used in a liquid crystal panel, it should be understood that the contrast ratio of the images that are being formed is improved.

Further, after the opposing substrate for liquid crystal panel and the TFT substrate (glass board made of fused silica) that has been prepared separately are treated for alignment, both substrates are bonded to each other via a spacer made of spherical silica fine particles (elastic modulus 7454 kgf/mm$^2$) and a sealing material. Next, liquid crystal is fed into the void from the inlet of the void formed between the opposing substrate for liquid crystal panel and the TFT substrate, and the inlet is plugged up, whereby a TFT liquid crystal panel with the structure shown in FIG. 6 (or the structure as referred to this) is manufactured.

A light beam is transmitted in the obtained TFT liquid crystal panel, as a result the emergent light from the TFT liquid crystal panel of each embodiment according to the present invention is brighter than the emergent light from the TFT liquid crystal panel of each comparison embodiment.

Afterward, using TFT liquid crystal panels obtained in the embodiments, the liquid crystal projectors with the structure shown in FIG. 7 (projection type display device) are assembled. As a result, each of the projectors is found to be capable of projecting a brighter image onto a screen.

As described above, according to the present invention, an aberration of a micro-lens can be reduced and the efficiency of light utilization can be enhanced.

Therefore, in the liquid crystal panels or the projection type display devices having a micro-lens substrate according to the present invention, for example, more efficient utilization of light can be achieved and a higher contrast ratio and higher transmittance can be obtained.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method of manufacturing a micro-lens board, comprising:
    bonding a first substrate having a plurality of curved lens surfaces to a second substrate having a plurality of curved lens surfaces, at least one of the first substrate and the second substrate is transparent; and
    forming a plurality of micro-lenses comprised of double convex lenses that are formed therebetween.

2. The method according to claim 1, wherein the optical axes of the opposing curved lens surfaces are placed adjacent to each other within 2 micrometers, and a plurality of microlens consisting of double convex lenses are formed.

3. A micro-lens substrate, wherein the micro-lens substrate is manufactured by the manufacturing method according to claim 1.

4. The method of claim 1, wherein the curvature radius of the curved surface of the lens of the first substrate and the curvature radius of the curved surface of the lens of the second substrate are different from each other.

5. The method according to claim 1, wherein a micro-lens substrate is positioned so that light falls on said first substrate, and said micro-lens substrate is positioned so that a curvature radius of the curved surface of lens of the greater than a curvature radius of the curved surface of lens of the second substrate.

6. The method according to claim 1, wherein a maximum thickness for the micro-dens is iii the range of 10 to 120 micrometers.

7. The method according to claim 1, wherein a focal length of the micro-lens is in the range of 20 to 100 micrometers.

8. The method according to claim 1, wherein a resin containing a spacer is disposed outside of the region where the curved surfaces of lens of at least one of the first substrate and the second substrate are provided, and said first substrate and said second substrate arc bonded to each other.

9. The method according to claim 8, wherein the spacer is particulate.

10. The method according to claim 1, wherein alignment marks are provided on said first substrate and said second substrate, respectively, and alignment of the first substrate and the second substrate are made using the alignment marks and the first substrate and the second substrate are bonded to each other.

11. The method according to claim 9, wherein the curved lens surfaces of the first substrate and the curved lens surfaces of the second substrate are formed by using a mask layer, and the alignment marks of the first substrate and the second substrate are formed by using a mask layer.

12. A method of manufacturing a micro-lens substrate, comprising;
    bonding a first substrate having a plurality of first concaves with curved lens surfaces to a second substrate having a plurality of second plural concaves with curved lens surfaces via resin so that said first concaves and said second concaves face each other and a plurality of micro-lenses comprised of double convex lenses are formed between the first substrate and the second substrate, at least one of the first substrate and the second substrate is transparent.

13. A micro-lens substrate, comprising:
    a substrate having a plurality of plural micro-lenses, wherein said micro-lenses include double convex lenses, and wherein a curvature radius of curve surface on a light-incident side of micro-lens and the curvature radius of curve surface on a light-emergent side of the micro-lens are different from each other.

14. The electro-optic device comprising the micro-lens substrate of claim 13.

15. A liquid crystal panel, comprising an opposing substrate for a liquid crystal panel according to claim 14.

16. A projection display device, comprising:
    light valves having liquid crystal panels according to claim 15 are provided, wherein light is modulated using at least one of said light valves and an image is projected.

17. A projection display device, comprising:
    three light valves corresponding to red, green and blue in color to form images;
    a light source;
    a color separation optical system to separate light emitted from said light source into a red light, a green light and a blue light, and to guide each of the lights to said light valves disposed for each of corresponding colors;
    a color synthesizing optical system to synthesize each of the images; and
    a projection optical system to project the image that has been synthesized, wherein said light valve has a liquid crystal panel according to claim 15.

18. The micro-lens substrate according to claim 13, wherein a spacer is provided that define a thickness of a resin layer outside a region where the micro-lens is formed.

19. The micro-lens substrate according to claim 18, wherein the spacer is particulate.

20. An opposing substrate for a liquid crystal panel, comprising a micro-lens substrate according to claim 13, a black matrix being provided on the micro-lens substrate and a conductive layer covering the black matrix.

21. The micro-lens substrate according to claim 13, wherein the first substrate is disposed on a side where light falls on and a curvature radius of carve surface on a light-incident side of the micro-lens is greater than the curvature radius of the curve surface on a light-emergent side of the micro-lens.

22. The micro-lens substrate according to claim 13, wherein a maximum thickness of the micro-lens is in the range of 10 to 120 micrometers.

23. The micro-ions substrate according to claim 13, wherein a focal length of the micro-lens is in the range of 20 to 1000 micrometers.

24. The micro-lens substrate according to claim 13, wherein alignment marks as an indicator for aligning are provided on the outside of a region where the micro-lenses arc placed.

25. An opposing substrate for a liquid crystal panel, wherein a conductive layer is provided on the micro-lens sustrate according to claim 13.

26. A liquid crystal panel, comprising:
    a liquid crystal drive substrate with a pixel electrode;
    an opposing substrate for a liquid crystal panel according to claim 25 bonded to said liquid crystal drive substrate; and liquid crystal sealed between said liquid crystal drive substrate and the opposing substrate for a liquid crystal panel.

27. A liquid crystal panel according to claim 26, wherein the liquid crystal drive substrate is a TFT substrate having the pixel electrode provided in a matrix and a thin film transistor connected to the pixel electrode.

28. A micro-lens substrate, comprising:

a first substrate having a plurality of first concaves formed on its surface;

a second substrate having a plurality of second concaves that is bonded to the first substrate via a resin layer; and a micro-lens is formed by a double convex lens between the first substrate and the second substrate, at least one of the first substrate and the second substrate is transparent.

29. The micro-lens substrate according to claim 28, wherein a thickness of the resin layer in a region where the micro-lenses are not formed is substantially equal to a Koba thickness of the micro-lens.

30. The micro-lens substrate according to claim 28, wherein the first substrate is thicker than the second substrate.

31. A micro-lens substrate, comprising:

a first substrate having a plurality of first concaves on a surface and a second substrate having a plurality of second concaves on a surface bonded to each other via a resin so that said first concaves and second concaves face each other, wherein micro-lenses comprised of double convex lenses are formed between said first substrate and said second substrate, and at least one of the first substrate and the second substrate is transparent.

* * * * *